(12) United States Patent
Misawa et al.

(10) Patent No.: US 7,940,628 B2
(45) Date of Patent: May 10, 2011

(54) MULTILAYER OPTICAL INFORMATION RECORDING MEDIUM, OPTICAL HEAD, AND OPTICAL DRIVE

(75) Inventors: Shigeyoshi Misawa, Tokyo (JP); Shigeru Oouchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 882 days.

(21) Appl. No.: 11/883,385

(22) PCT Filed: Nov. 30, 2006

(86) PCT No.: PCT/JP2006/324406
§ 371 (c)(1),
(2), (4) Date: Aug. 1, 2007

(87) PCT Pub. No.: WO2007/064040
PCT Pub. Date: Jun. 7, 2007

(65) Prior Publication Data
US 2008/0165652 A1    Jul. 10, 2008

(30) Foreign Application Priority Data

Dec. 2, 2005  (JP) ................. 2005-349202
Jan. 25, 2006  (JP) ................. 2006-016382

(51) Int. Cl.
*G11B 7/20* (2006.01)
(52) U.S. Cl. ........................................ 369/94
(58) Field of Classification Search .................. None
See application file for complete search history.

(56) References Cited

U.S. PATENT DOCUMENTS

| | | | |
|---|---|---|---|
| 5,172,369 A * | 12/1992 | Chikuma et al. | 369/112.24 |
| 6,574,174 B1 | 6/2003 | Amble et al. | |
| 6,738,322 B2 | 5/2004 | Amble et al. | |
| 6,738,324 B2 | 5/2004 | Saimi et al. | |
| 6,797,090 B2 * | 9/2004 | Yang et al. | 156/74 |
| 6,934,243 B2 | 8/2005 | Akiyama et al. | |
| 7,403,457 B2 | 7/2008 | Ogawa et al. | |
| 2002/0041564 A1 * | 4/2002 | Yoshinari et al. | 369/275.3 |
| 2002/0181352 A1 | 12/2002 | Saimi et al. | |
| 2003/0081523 A1 | 5/2003 | Miyagawa et al. | |
| 2004/0001400 A1 * | 1/2004 | Amble et al. | 369/44.26 |
| 2005/0013216 A1 | 1/2005 | Kim et al. | |
| 2005/0157629 A1 | 7/2005 | Shiono et al. | |
| 2005/0243699 A1 * | 11/2005 | Noda et al. | 369/275.4 |
| 2005/0254403 A1 | 11/2005 | Ishibashi et al. | |
| 2006/0023588 A1 | 2/2006 | Miyagawa et al. | |

(Continued)

FOREIGN PATENT DOCUMENTS

EP    1 300 835 A2    4/2003
(Continued)

OTHER PUBLICATIONS

Japanese Notice of Rejection, Oct. 28, 2009.

*Primary Examiner* — Daniell L Negrón
*Assistant Examiner* — Henok Heyi
(74) *Attorney, Agent, or Firm* — Dickstein Shapiro LLP

(57) ABSTRACT

A disclosed optical recording medium includes multiple recording layer units in each of which one or more recording layers and one or more middle layers are stacked alternately; and one or more spacer layers. In the disclosed optical recording medium, the recording layer units and the spacer layers are stacked alternately in a depth direction of the optical recording medium.

16 Claims, 30 Drawing Sheets

U.S. PATENT DOCUMENTS

| | | |
|---|---|---|
| 2006/0203680 A1 | 9/2006 | Hong et al. |
| 2008/0165652 A1 | 7/2008 | Misawa et al. |

FOREIGN PATENT DOCUMENTS

| | | |
|---|---|---|
| EP | 1 300 836 A2 | 4/2003 |
| EP | 1 494 229 A1 | 1/2005 |
| EP | 1 701 348 A2 | 9/2006 |
| JP | 61-248232 A | 11/1986 |
| JP | 64-17228 A | 1/1989 |
| JP | 3-254439 A | 11/1991 |
| JP | H06-028672 | 2/1994 |
| JP | 3110532 | 9/2000 |
| JP | 2001-155380 | 6/2001 |
| JP | 2001-307344 A | 11/2001 |
| JP | 2002-312958 | 10/2002 |
| JP | 2003-036537 | 2/2003 |
| JP | 2003-51129 A | 2/2003 |
| JP | 2003-141739 | 5/2003 |
| JP | 2004-079121 | 3/2004 |
| JP | 2005-018852 | 1/2005 |
| JP | 2005-259192 | 9/2005 |
| JP | 2006-260669 | 9/2006 |
| TW | 200304644 A | 10/2003 |
| TW | 200510910 A | 3/2005 |
| WO | WO 03/105139 A1 | 12/2003 |
| WO | WO-2004/036554 A2 | 4/2004 |
| WO | WO 2004/036564 A1 | 4/2004 |

\* cited by examiner

MULTILAYER OPTICAL INFORMATION RECORDING MEDIUM, OPTICAL HEAD, AND OPTICAL DRIVE

TECHNICAL FIELD

The present invention generally relates to a multilayer optical information recording medium, an optical head, and an optical drive, and more particularly relates to a multilayer optical information recording medium with multiple recording layers, an optical head for the multilayer optical information recording medium, and an optical drive capable of recording, reproducing, and/or deleting information on the multilayer optical information recording medium.

BACKGROUND ART

Patent document 1 discloses a method of optically writing, reading, and/or deleting information on a conventional multilayer optical information recording medium having at least two recording layers and two guide layers; and an apparatus for writing, reading, and/or deleting information on the conventional multilayer optical information recording medium. FIG. 14 shows the structure of an exemplary recording medium described in patent document 1. The exemplary recording medium includes multiple recording layers 3 and one tracking layer (control layer) 5 for the multiple recording layers 3.

Patent document 2 discloses a recording medium made by stacking control layers used for tracking and layers made of a photosensitive material. Patent document 3 discloses an optical memory device in which a recording layer is provided next to a core layer made of resin or a clad layer made of resin and a barrier layer is provided between the recording layer and the core layer or the clad layer to prevent them from blending.

Also, patent document 4 discloses a multilayer optical recording medium made by stacking recording layers and non-recording layers alternately using adhesive sheets each made up of an optical recording layer containing a photosensitive material and an adhesive layer.

[Patent document 1] Japanese Patent No. 3110532
[Patent document 2] Japanese Patent Application Publication No. 2003-36537
[Patent document 3] Japanese Patent Application Publication No. 2003-141739
[Patent document 4] Japanese Patent Application Publication No. 2005-259192

However, in a multilayer optical information recording medium having a structure as described above, as the number of layers increases, fluctuation of reflectance caused by differences in the wavelength or incidence angle of light becomes greater and wavelength dependence becomes greater. In other words, the amount of reflected light in recording or reading a signal fluctuates depending on the wavelength or incidence angle of the light. This fluctuation causes an increase in noise and results in a decrease in the S/N ratio.

Also, in a multilayer optical recording medium with a control layer used for tracking as shown in FIG. 14, as the number of recording layers increases, the distance between each recording layer and the control layer increases. This makes it difficult to position a laser beam accurately.

Further, since the recording layers are formed just above the control layer, methods that can be used to process the control layer are limited and therefore flexibility in designing the control layer is reduced.

Meanwhile, in recent years, with the development of digital technologies and the improvement in data compression techniques, optical disks such as a digital versatile disk (DVD) have gotten a lot of attention as media for recording information such as music, movies, photographs, and computer programs (hereafter, may also be called "contents"). Also, as the prices of optical disks become lower, optical drives for recording and/or reproducing information on optical disks have become widespread.

As the data sizes of contents increase year by year, there is an increasing demand for an optical disk with higher storage capacity. One way to increase the storage capacity of an optical disk is to provide multiple recording layers. Currently, development of optical disks having multiple recording layers (hereafter, may also be called "multilayer disks" or "multilayer optical disks") and optical drives for recording/reproducing information on such multilayer disks are very active.

However, if the number of recording layers in a conventional optical disk is increased, the amount of light reflected from a recording layer decreases as the distance between the recording layer and the incidence plane increases, because light is absorbed by other recording layers. As a result, the amount of light reflected from a distant recording layer decreases to such a level that it is difficult to detect a signal. Also, a conventional laser diode may not be powerful enough to record information on such a multilayer optical disk. These problems have been limiting the number of recording layers in an optical disk.

To solve the above problems and thereby to increase the number of recording layers, multilayer disks using two-photon absorption materials have been proposed (see, for example, patent documents 5 and 6). The refractive index of a two-photon absorption material changes when it absorbs two photons simultaneously. The proposed multilayer disks utilize this characteristic of two-photon absorption materials. On a proposed multilayer disk, information is recorded by changing the refractive index of target areas. These refractive index changed areas are called pits. More specifically, information is represented by the lengths and combination of refractive index changed areas and refractive index unchanged areas.

The probability of occurrence of two-photon absorption is proportional to the square of an applied optical-electric field (intensity of an incident light). Therefore, two-photon absorption occurs only in an area where the energy of an incident light is concentrated. When an incident light is focused by a lens, two-photon absorption occurs only around the focal point and does not occur in other areas where the incident light is not focused. In other words, the refractive indices of recording layers other than that on which incident light is focused do not change and those recording layers transmit the incident light without changing its intensity. Therefore, in this case, increasing the number of recording layers does not make it difficult to detect a signal or cause recording power shortage problems.

Thus, using two-photon absorption materials makes it possible to increase the number of recording layers and thereby to greatly increase the storage capacity of an optical disk. However, as in the case of conventional multilayer disks, forming guide tracks on each of the recording layers results in increased costs.

To obviate this problem, multilayer disks having guide tracks on a layer other than recording layers have been proposed (see, for example, patent documents 7 and 8).

Patent document 7 discloses a recording medium having a servo layer. With the disclosed recording medium, servo control is performed by detecting reflected light from the servo layer. However, if the recording medium is tilted in the radial direction in relation to the incidence angle of light, a tracking error may occur on a data layer that is distant from the servo layer. For example, on a data layer that is 1 mm distant from the servo layer, when the recording medium is tilted 1 degree in relation to the incidence angle of the light, the focal point of the light is shifted as much as 17.4 µm. On a Blu-ray disk with a track pitch of 0.32 µm, 17.4 µm is equivalent to about 50 tracks. For this reason, the recording medium disclosed in patent document 7 requires a tilt control that is different from that for a recording medium with a few recording layers. Also, although a small light spot can be formed on a data layer where a two-photon absorption material is used, a light spot becomes large on the servo layer where no two-photon absorption material is used. This problem makes it difficult to increase the track density of a recording medium and thereby makes it difficult to increase the storage capacity per data layer.

Patent document 8 discloses an optical information recording medium including a first layer having alternate convexities and concavities and a second layer having alternate convexities and concavities. In this case, however, it is very difficult to accurately align the convexities and concavities on the first and second layers.

[Patent document 5] Japanese Patent Application Publication No. 6-28672

[Patent document 6] Japanese Patent Application Publication No. 2004-79121

[Patent document 7] Japanese Patent Application Publication No. 2002-312958

[Patent document 8] Japanese Patent Application Publication No. 2005-18852

DISCLOSURE OF THE INVENTION

The present invention provides a multilayer optical information recording medium, an optical head, and an optical drive that substantially obviate one or more problems caused by the limitations and disadvantages of the related art.

Embodiments of the present invention provide a multilayer optical information recording medium that makes it possible to reduce the fluctuation in the amount of reflected light in recording or reading a signal even when the wavelength or incidence angle of the light varies and thereby to prevent the S/N ratio from decreasing; to accurately position a laser beam even when the number of recording layers is large; and to use various methods to process a control layer and thereby to design the control layer flexibly.

According to an embodiment of the present invention, an optical recording medium includes multiple recording layer units in each of which one or more recording layers and one or more middle layers are stacked alternately; and one or more spacer layers; wherein the recording layer units and the spacer layers are stacked alternately in a depth direction of the optical recording medium.

According to an embodiment of the present invention, an optical recording medium includes multiple recording layers in each of which recording marks each having a refractive index different from that of a surrounding area are arranged so as to form multiple layers of the recording marks, wherein the recording marks in each of the layers of the recording marks are horizontally arranged at intervals and the layers of the recording marks are vertically arranged at intervals; and one or more spacer layers; wherein the recording layers and the spacer layers are stacked alternately in a depth direction of the optical recording medium.

An embodiment of the present invention provides a high capacity multilayer optical information recording medium with a tilt tolerance that is substantially equal to that of a recording medium having only a few recording layers.

Another embodiment of the present invention provides an optical head that can accurately detect a signal from a multilayer optical information recording medium according to an embodiment of the present invention.

Still another embodiment of the present invention provides an optical drive that can accurately record, reproduce, and/or delete information on a multilayer optical information recording medium according to an embodiment of the present invention.

According to an embodiment of the present invention, an optical recording medium includes multiple multilayer units each including a guide layer corresponding to light with a first wavelength and multiple recording layers corresponding to light with a second wavelength that is different from the first wavelength; wherein the multilayer units are stacked in a depth direction of the optical recording medium.

According to an embodiment of the present invention, an optical recording medium includes multiple guide layers corresponding to light with a first wavelength; and multiple recording layers corresponding to light with a second wavelength that is different from the first wavelength.

According to an embodiment of the present invention, an optical recording medium includes multiple multilayer units each including multiple guide layers corresponding to light with a first wavelength, and multiple recording layers corresponding to light with a second wavelength that is different from the first wavelength; wherein the multilayer units are stacked in a depth direction of the optical recording medium.

An optical head for recording or reproducing information on an optical recording medium according to an embodiment of the present invention includes a first light source configured to emit a light beam with the first wavelength, a second light source configured to emit a light beam with the second wavelength; an objective lens configured to focus the light beam with the first wavelength on the guide layer and to focus the light beam with the second wavelength on one of the recording layers; an optical system configured to guide the light beam with the first wavelength and the light beam with the second wavelength to the objective lens and to separate a light beam reflected from the guide layer and a light beam reflected from the one of the recording layers; a first photodetector configured to detect the light beam reflected from the guide layer; and a second photodetector configured to detect the light beam reflected from the one of the recording layers.

BEST MODE FOR CARRYING OUT THE INVENTION

Preferred embodiments of the present invention are described below with reference to the accompanying drawings.

Figure 1:
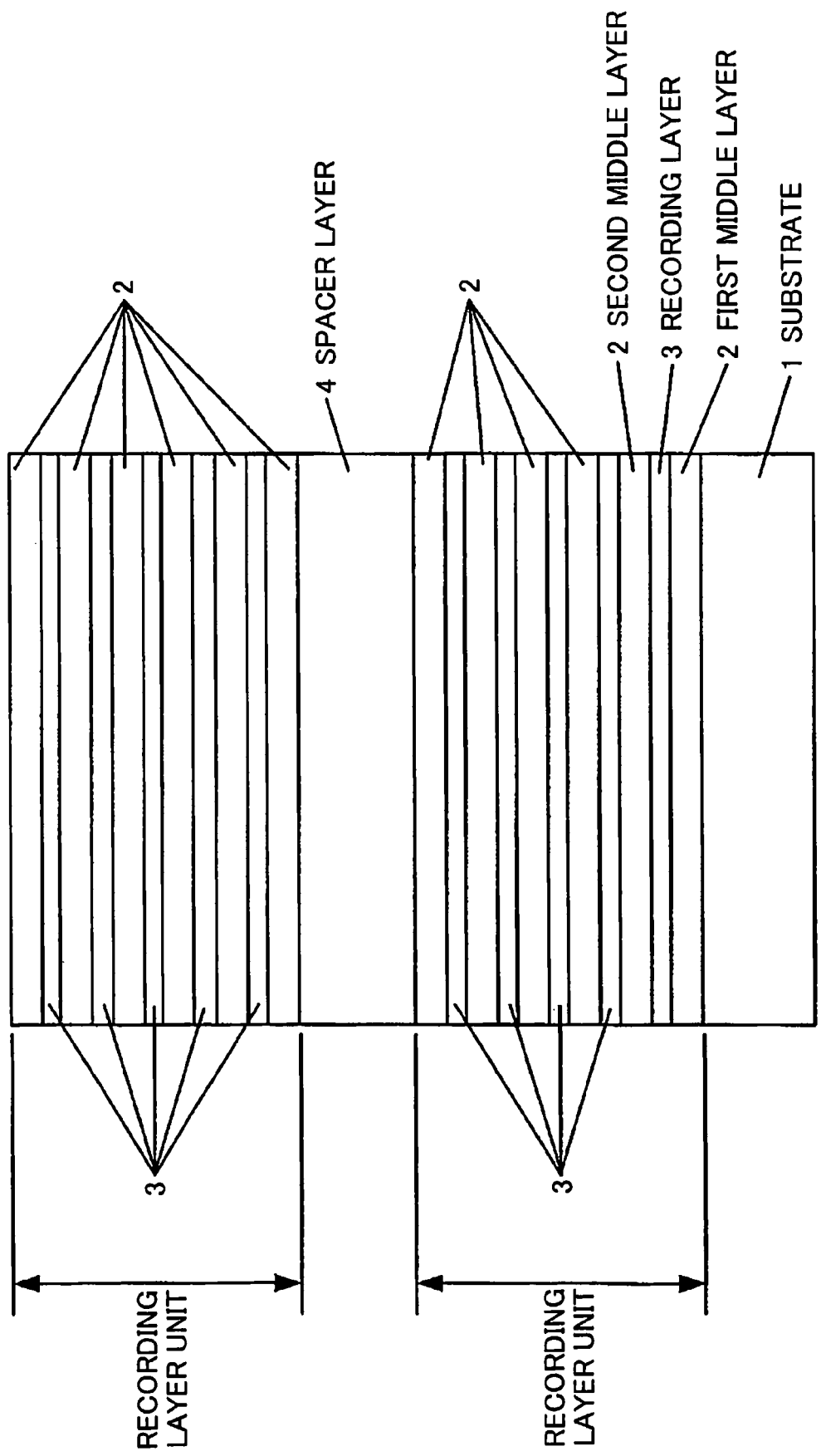
FIG. 1 is a drawing illustrating the configuration of a first exemplary multilayer optical information recording medium according to a first embodiment of the present invention.

FIG. 1 is a drawing illustrating the configuration of a first exemplary multilayer optical information recording medium according to a first embodiment of the present invention. The first embodiment of the present invention is described below with reference to FIG. 1. As shown in FIG. 1, in the first exemplary multilayer optical information recording medium, a first middle layer 2, a first recording layer 3, a second middle layer 2, and a second recording layer 3 are stacked on a substrate 1. In a similar manner, for example, five recording layers 3 and six middle layers 2 are stacked to form a recording layer unit. Further, a separating layer (spacer layer) 4 is stacked on the recording layer unit. Thus, the first exemplary multilayer optical information recording medium is produced by stacking multiple recording layer units and one or more spacer layers 4 alternately on the substrate 1.

To form a recording mark on the recording layer 3 of the first exemplary multilayer optical information recording medium, light with a light source wavelength is focused (a light spot is formed) on the recording layer 3 using an objective lens.

In this embodiment, the recording layer 3 may be made of a material the refractive index of which is increased by a light spot or a material the refractive index of which is decreased by a light spot. The thickness of the recording layer 3 is preferably smaller than the depth of a light spot. On the other hand, the thickness of the middle layer 2 is preferably equal to or larger than the depth of a light spot.

The refractive index in an area where a recording mark is formed and the refractive index in an area where no recording mark is formed are different. Therefore, the reflectance at the surface boundary between the middle layer 2 and the recording layer 3 differs depending on whether a recording mark is formed. The difference in reflectance results in the difference in intensity of reflected light. Information on the first exemplary multilayer optical information recording medium is read as the difference in intensity of reflected light.

For the substrate 1, materials such as glass, crystalline oxide, polycarbonate, and polyolefin that are transparent to a light source wavelength may be used. For the middle layer 2, a material that is transparent to a light source wavelength may be used. For the recording layer 3, a material that absorbs a part of light with a light source wavelength may be used. The middle layer 2 is, for example, formed by applying a resin such as polyvinyl alcohol or ethylene vinyl alcohol. Also, the middle layer 2 may also be formed by fusion-bonding, extruding, laminating, or vapor-depositing a transparent resin, such as polycarbonate, polystyrene, polyamide, epoxy, or urethane resin, or its film.

Further, the material for the middle layer 2 is not limited to organic materials. The middle layer 2 may be formed by vapor-depositing or sputtering a material such as glass or an oxide. The recording layer 3 may be formed by applying or vapor-depositing a mixture of a resin, such as polymethyl methacrylate or polystyrene, and a photochromic dye, such as spiropyran, diarylethene, or fulgide, the refractive index or absorption wavelength of which changes by absorption of light with a specific light source wavelength. On a recording layer containing a photochromic dye, information can be recorded by causing multiphoton absorption, for example, two-photon absorption, using a short pulse, high-power laser. The separating layer (spacer layer) 4 may be formed using substantially the same method and materials as those used for forming the middle layer 2. Also, the spacer layer 4 may be an adhesive layer or a pressure-sensitive adhesive layer.

Also, a barrier layer (not shown) may be provided between the recording layer 3 and the middle layer 2. The barrier layer prevents a solvent used in one layer from dissolving the other layer and thereby makes it possible to form each layer by applying a solution. In other words, the barrier layer makes it easier to form the recording layer 3 and the middle layer 2. The barrier layer may also make it easier to reduce the thickness of the recording layer 3 and the middle layer 2 to increase light transmission.

Figure 2:
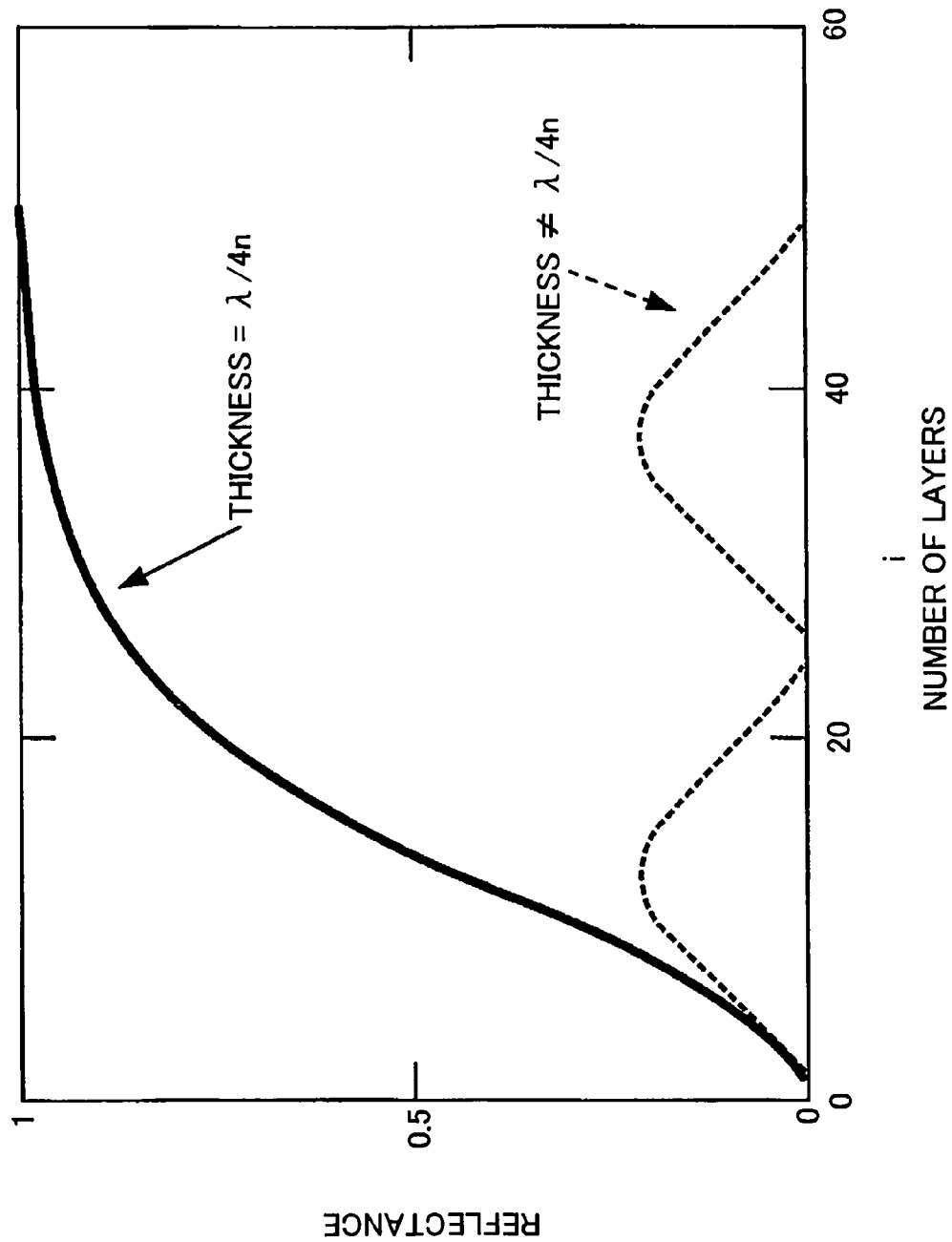
FIG. 2 is a graph showing the relationship between the number of layers in the first exemplary multilayer optical information recording medium shown in FIG. 1 and its reflectance.

The characteristics of the first exemplary multilayer optical information recording medium are described below with reference to FIGS. 2 and 3. FIG. 2 is a graph showing the relationship between the number of layers in the first exemplary multilayer optical information recording medium shown in FIG. 1 and its reflectance. More specifically, the graph shows changes in the reflectance, measured from the side opposite to the substrate 1, when the total number of the middle layers 2 and the recording layers 3 is changed between 5 and 50. The changes in the reflectance are calculated by just changing the total number of the middle layers 2 and the recording layers 3 without taking into account the effects of the spacer layer 4 and the substrate 1.

In the calculation, refractive index n2 of the recording layer 3 is set to 1.6, refractive index n3 of the middle layer 2 is set to 1.5, and light source wavelength λ is set to 0.66 μm. In FIG. 2, the solid line shows the reflectances when the thickness of the recording layer 3 is λ/4n2 and the thickness of the middle layer 2 is an odd multiple of λ/4n3; and the dotted line shows the reflectances when the thicknesses of the recording layer 3 and the middle layer 2 are slightly different from λ/4n2 and an odd multiple of λ/4n3.

As the graph shows, when the thickness of the middle layer 2 is an odd multiple of λ/4n3, the reflectance of the first exemplary multilayer optical information recording medium increases sharply as the total number of layers increases. This means that light cannot reach a layer that is distant from the side opposite to the substrate 1 and is therefore not preferable.

Figure 3:
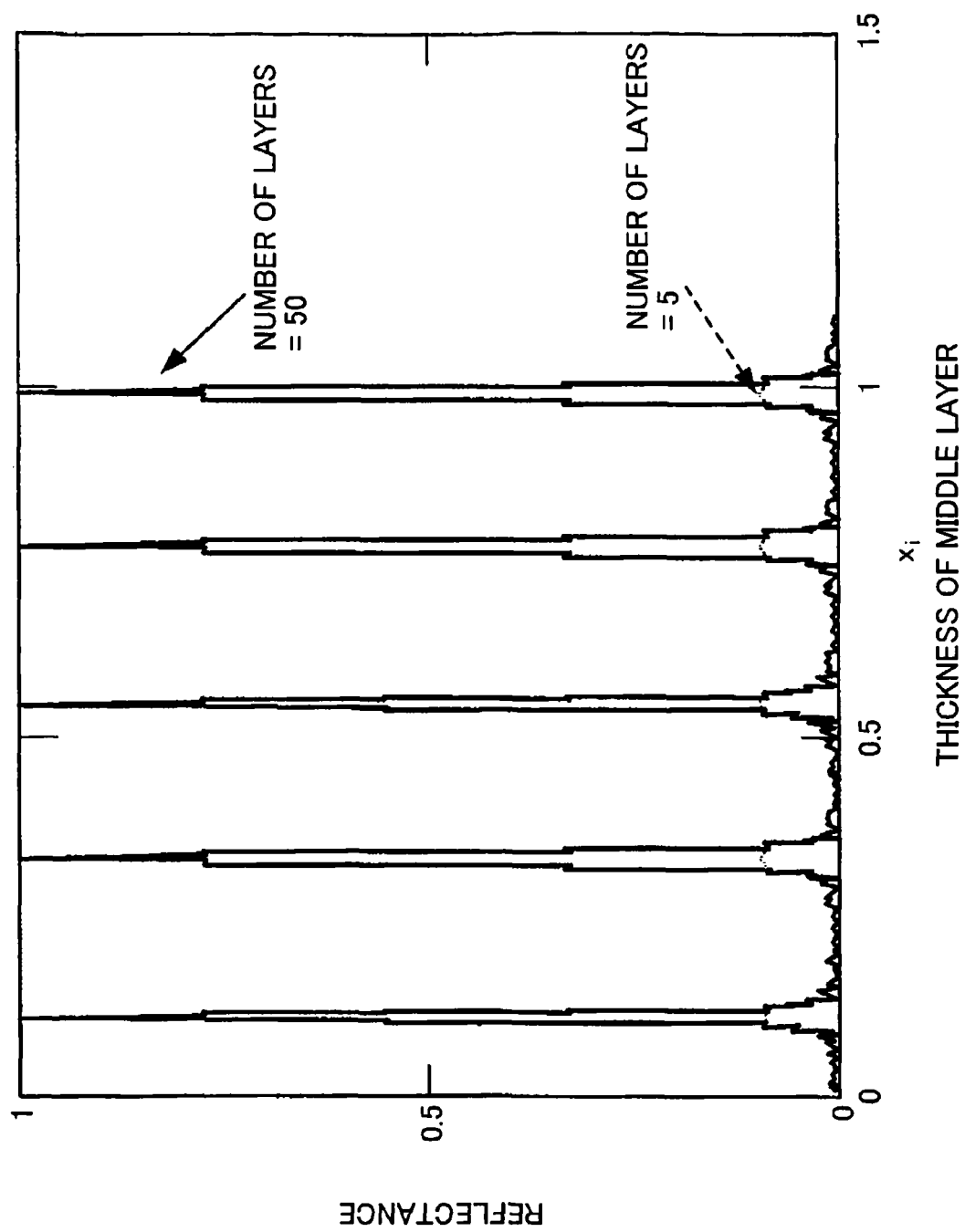
FIG. 3 is a graph showing the relationship between the thickness of each middle layer and the reflectance of the first exemplary multilayer optical information recording medium.

FIG. 3 is a graph showing the relationship between the thickness of the middle layer 2 and the reflectance of the first exemplary multilayer optical information recording medium. In this calculation, the thickness of the recording layer 3 is fixed at λ/4n2 and the thickness of the middle layer 2 is varied. The reflectance at five layers is indicated by a dotted arrow and the reflectance at 50 layers is indicated by a solid arrow. The exemplary multilayer optical information recording medium used in this calculation includes 10 recording layer units each composed of five layers. As the graph shows, with a large number of layers, the reflectance becomes high when the middle layer 2 has one of certain thicknesses that exist at regular intervals.

Accordingly, it is preferable to avoid a combination of a thickness and a refractive index (optical path length: the product of a thickness and a refractive index) of the middle layer 2 which combination results in increased reflectance as shown in FIG. 3.

Also, when producing a multilayer optical information recording medium by stacking multiple recording layer units each composed of at least one recording layer 3 and one middle layer 2, the thicknesses and the refractive indices of the middle layers 2 among the recording layer units are not necessarily the same and are preferably varied. Further, the optical path length (the product of a thickness and a refractive index) of the spacer layer 4 is preferably an even multiple of λ/2.

When a recording medium is produced by alternately stacking recording layer units and the spacer layers 4, the spacer layer 4 with the optical path length as described above contributes to preventing the decrease in light transmission of the recording medium even when each of the recording layer units have a high reflectance.

Figure 4:
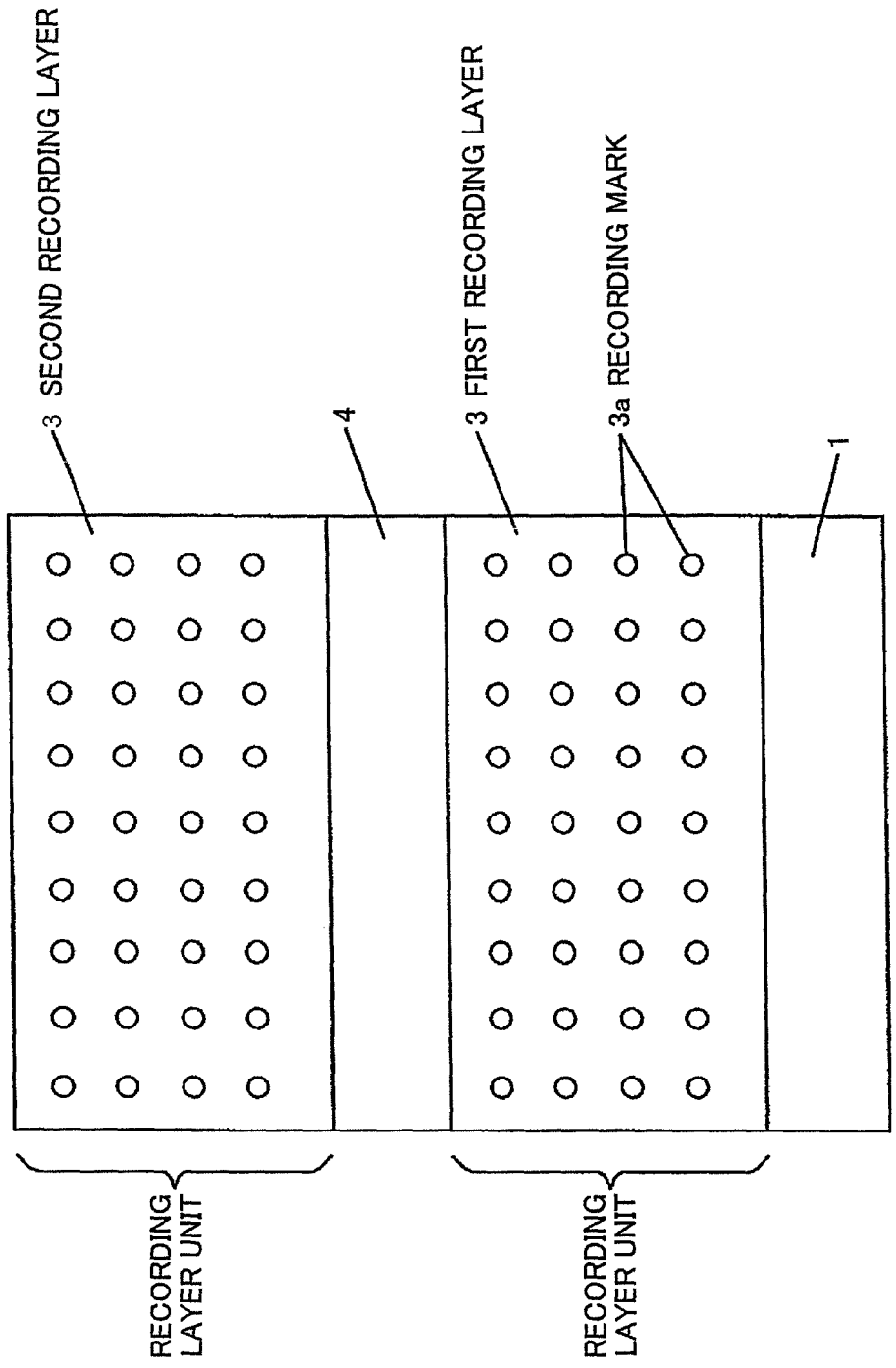
FIG. 4 is a drawing illustrating the configuration of a second exemplary multilayer optical information recording medium according to a second embodiment of the present invention.

FIG. 4 is a drawing illustrating the configuration of a second exemplary multilayer optical information recording medium according to a second embodiment of the present invention. The second embodiment of the present invention is described below with reference to FIG. 4. As shown in FIG. 4, in the second exemplary multilayer optical information recording medium, a first recording layer 3 is formed on a substrate 1. In the first recording layer 3, recording marks 3a, which are recording spots each having a refractive index different from the surrounding area, are horizontally arranged at intervals; and layers of the horizontally arranged recording marks 3a are vertically (perpendicularly to the substrate 1) arranged at regular intervals.

In this embodiment, the recording layer 3 in which the recording marks 3a are horizontally and vertically arranged at intervals is treated as a recording layer unit. A spacer layer 4 is stacked on the recording layer 3. On the spacer layer 4, a second recording layer 3 is stacked. As in the first recording layer 3, the recording marks 3a are horizontally and vertically arranged at intervals in the second recording layer 3. Another spacer layer 4 is stacked on the second recording layer 3. Thus, the second exemplary multilayer optical information recording medium is produced by alternately stacking the recording layers 3 and the spacer layers 4.

The recording mark 3a is formed by focusing light with a light source wavelength (by forming a light spot) on the recording layer 3 using an objective lens. In this embodiment, the recording layer 3 may be made of a material the refractive index of which is increased by a light spot or a material the refractive index of which is decreased by a light spot. The refractive index in the recording mark 3a and the refractive index in the surrounding area are different. Therefore, the reflectance in an area differs depending on whether a recording mark is formed. The difference in reflectance results in the difference in intensity of reflected light. Information on the second exemplary multilayer optical information recording medium is represented by the difference in intensity of reflected light.

For the substrate 1, the same materials described in the first embodiment may be used. The recording layer 3 may be formed by applying or vapor-depositing a mixture of a resin, such as polymethyl methacrylate or polystyrene, and a photochromic dye, such as spiropyran, diarylethene, or fulgide, the refractive index or absorption wavelength of which changes by absorption of light with a specific light source wavelength. On a recording layer containing a photochromic dye, information can be recorded by causing multiphoton absorption, for example, two-photon absorption, using a short pulse, high-power laser. The separating layer (spacer layer) 4 may be formed using substantially the same method and materials as those used for forming the middle layer 2 in the first embodiment. Also, the middle layer 2 in the first embodiment may be used instead of the spacer layer 4.

The second exemplary multilayer optical information recording medium has characteristics similar to those of the first exemplary multilayer optical information recording medium shown in FIGS. 2 and 3. The interval (distance) between the layers of the recording marks 3a in the second embodiment corresponds to the thickness of the middle layer 2 in the first embodiment. When the interval between the layers of the recording marks 3a is an odd multiple of $\lambda/4n2$ ($\lambda$ is the light source wavelength and n2 is the refractive index of the recording layer 3), the reflectance of the second exemplary multilayer optical information recording medium increases sharply as the number of the layers of the recording marks 3a increases. This means that light cannot reach a layer that is distant from the side opposite to the substrate 1 and is therefore not preferable.

Also, with a large number of layers, the reflectance becomes high when the interval between the layers of the recording marks 3a takes certain values that exist at regular intervals. Accordingly, it is preferable to avoid a combination of an interval between the layers of the recording marks 3a and a refractive index of the recording layer 3 (optical path length: the product of an interval and a refractive index) which combination results in increased reflectance.

Also, when producing a multilayer optical information recording medium by stacking multiple recording layer units each composed of one recording layer 3, the intervals between the layers of the recording marks 3a and the refractive indices of the recording layers 3 among the recording layer units are not necessarily the same and are preferably varied. Further, the optical path length (the product of a thickness and a refractive index) of the spacer layer 4 is preferably an even multiple of $\lambda/2$.

When a recording medium is produced by alternately stacking multiple recording layer units, each of which is composed of one recording layer 3 in which the recording marks 3a are horizontally and vertically arranged at intervals, and the spacer layers 4, the spacer layer 4 with the optical path length as described above contributes to preventing the decrease in light transmission of the recording medium even when each of the recording layer units have a high reflectance.

Figure 5:
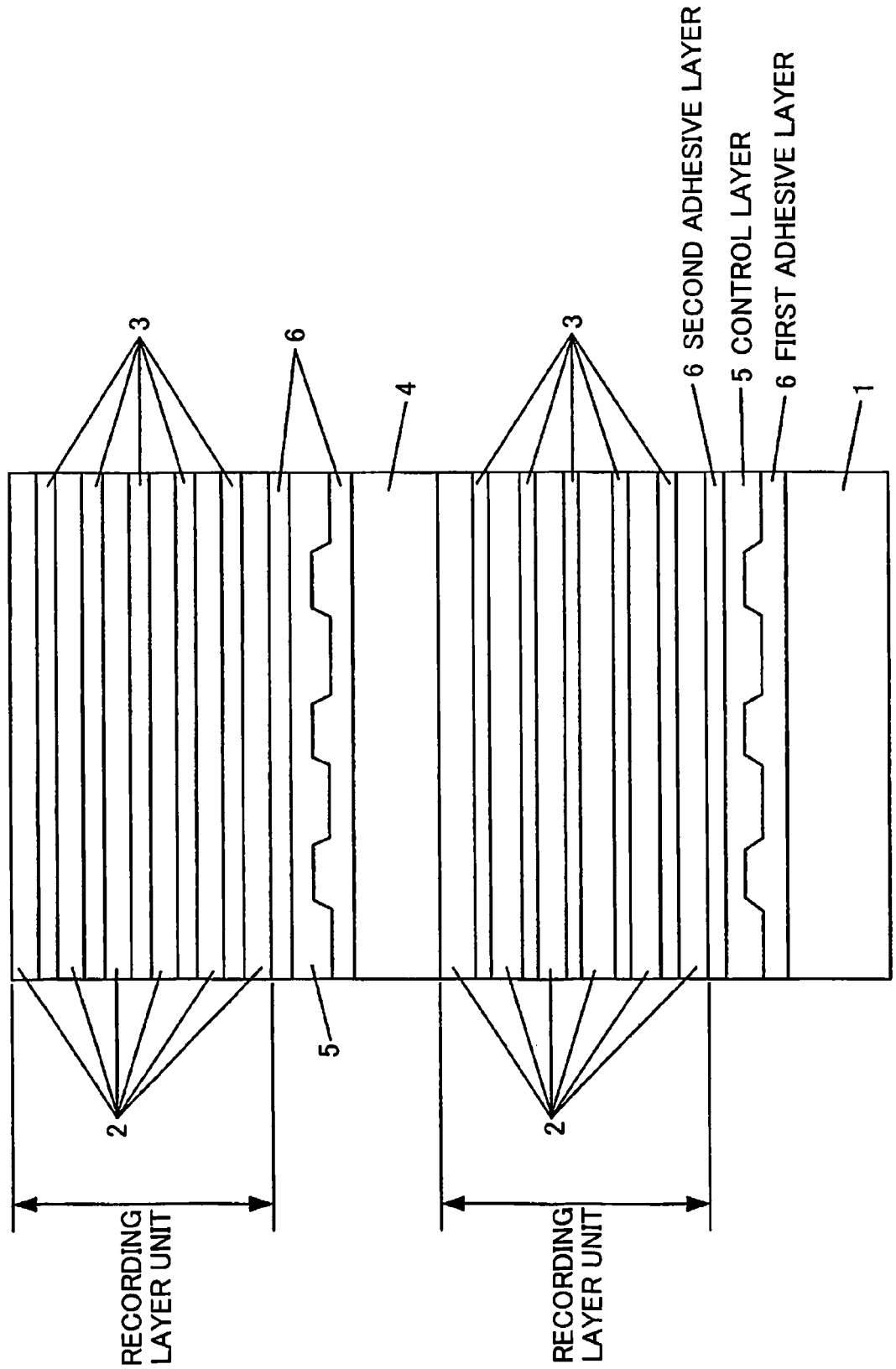
FIG. 5 is a drawing illustrating the configuration of a third exemplary multilayer optical information recording medium according to a third embodiment of the present invention.

FIG. 5 is a drawing illustrating the configuration of a third exemplary multilayer optical information recording medium according to a third embodiment of the present invention. The third embodiment of the present invention is described below with reference to FIG. 5. As shown in FIG. 5, the third exemplary multilayer optical information recording medium has a structure similar to that of the first exemplary multilayer optical information recording medium shown in FIG. 1, except that a first adhesive layer 6, a control layer 5, and a second adhesive layer 6 are formed between the substrate 1 and the middle layer 2. Grooves used for tracking are formed on the control layer 5 and the refractive index of the control layer 5 is different from that of the adhesive layer 6. The refractive index of the control layer 5 may be higher or lower than that of the adhesive layer 6.

On the second adhesive layer 6, the middle layers 2 and the recording layers 3 are stacked alternately as in the first exemplary multilayer optical information recording medium. Also, the spacer layer 4 is stacked on top of them. The third exemplary multilayer optical information recording medium is produced by stacking sets of the above mentioned layers.

In the third embodiment, a recording layer unit is made up of five recording layers 3 and six middle layers 2, and one control layer 5 is provided for each recording layer unit. However, the present invention is not limited to this configuration. As a value obtained by a formula [(thickness of recording layer 3)×number of layers+(thickness of middle layer 2)×number of layers] increases, the distance between the control layer 5 and the most distant recording layer 3 increases. In a tracking method that uses light beams from two light sources, a large distance between the control layer 5 and the recording layer 3 results in a low accuracy in positioning a light spot of a recording light beam. For this reason, the number of layers in a recording layer unit is preferably no more than 100.

In this embodiment, as shown in FIG. 5, grooves are formed on a surface of the control layer 5, which surface is closer to the substrate 1, to detect a tracking error using a push-pull method. However, grooves may be formed on the opposite surface of the control layer 5. Also, tracking guides formed by refractive index modulation may be used instead of grooves. Further, the pattern of the grooves is not limited to a specific pattern. For example, the grooves may be formed concentrically or spirally.

Other configurations and characteristics of the third exemplary multilayer optical information recording medium are substantially the same as those of the first exemplary multilayer optical information recording medium. The control layer 5 may be formed by applying a UV curing resin and by pressing a transparent stump with a patterned indented surface onto the applied UV curing resin. For the adhesive layer 6, an adhesive or a pressure-sensitive adhesive made of resin may be used.

Figure 6:
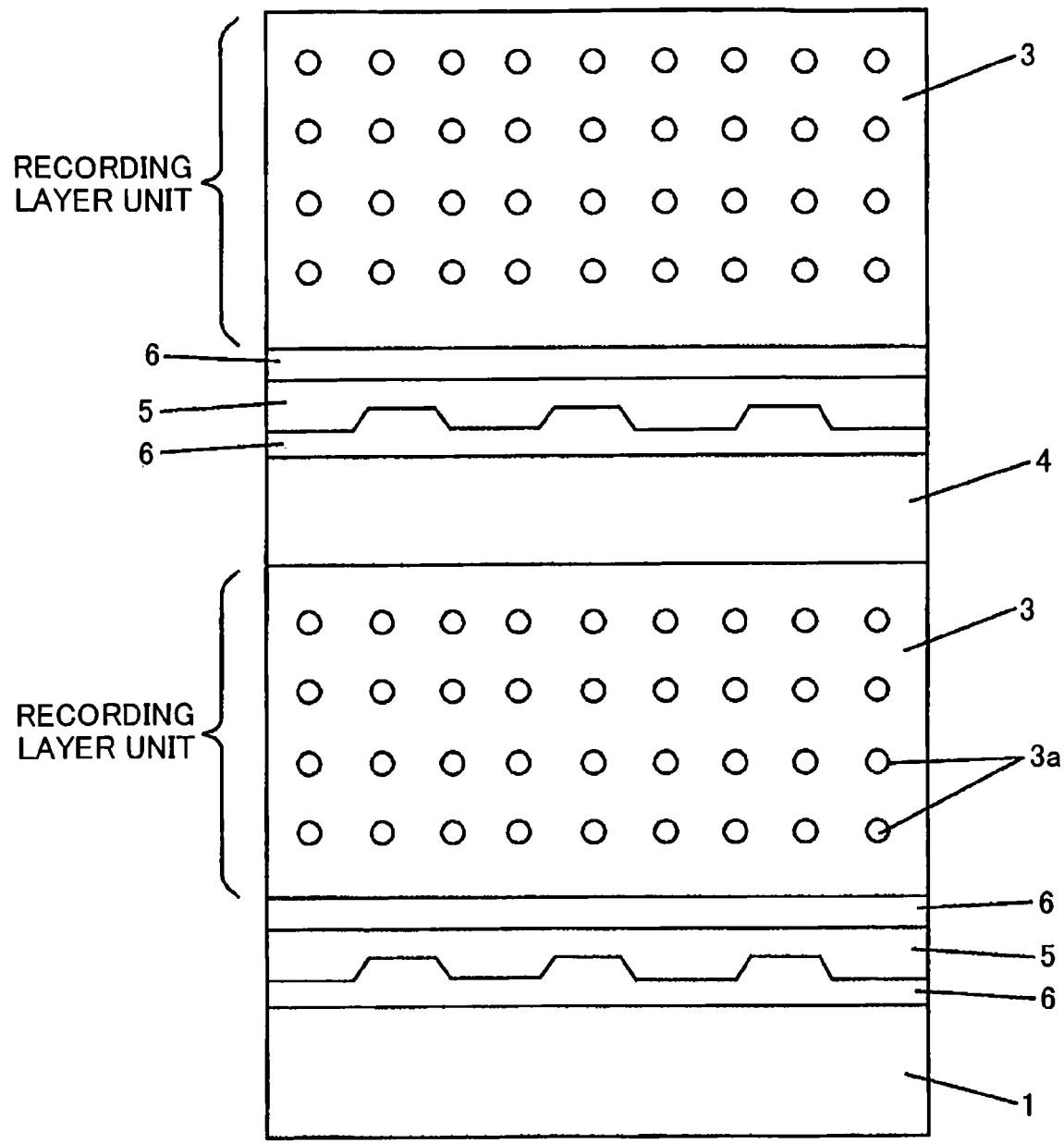
FIG. 6 is a drawing illustrating the configuration of a fourth exemplary multilayer optical information recording medium according to a fourth embodiment of the present invention.

FIG. 6 is a drawing illustrating the configuration of a fourth exemplary multilayer optical information recording medium according to a fourth embodiment of the present invention. The fourth embodiment of the present invention is described below with reference to FIG. 6. The fourth exemplary multilayer optical information recording medium is produced by adding the control layers 5 and the adhesive layers 6 according to the third embodiment shown in FIG. 5 to the structure of the second exemplary multilayer optical information recording medium shown in FIG. 4. As shown in FIG. 6, the first adhesive layer 6, the control layer 5, and the second adhesive layer 6 are formed between the substrate 1 and the first recording layer 3, and between the spacer layer 4 and the second recording layer 3. Other configurations and characteristics of the fourth exemplary multilayer optical information recording medium are substantially the same as those of the second and third exemplary multilayer optical information recording media.

Figure 7:
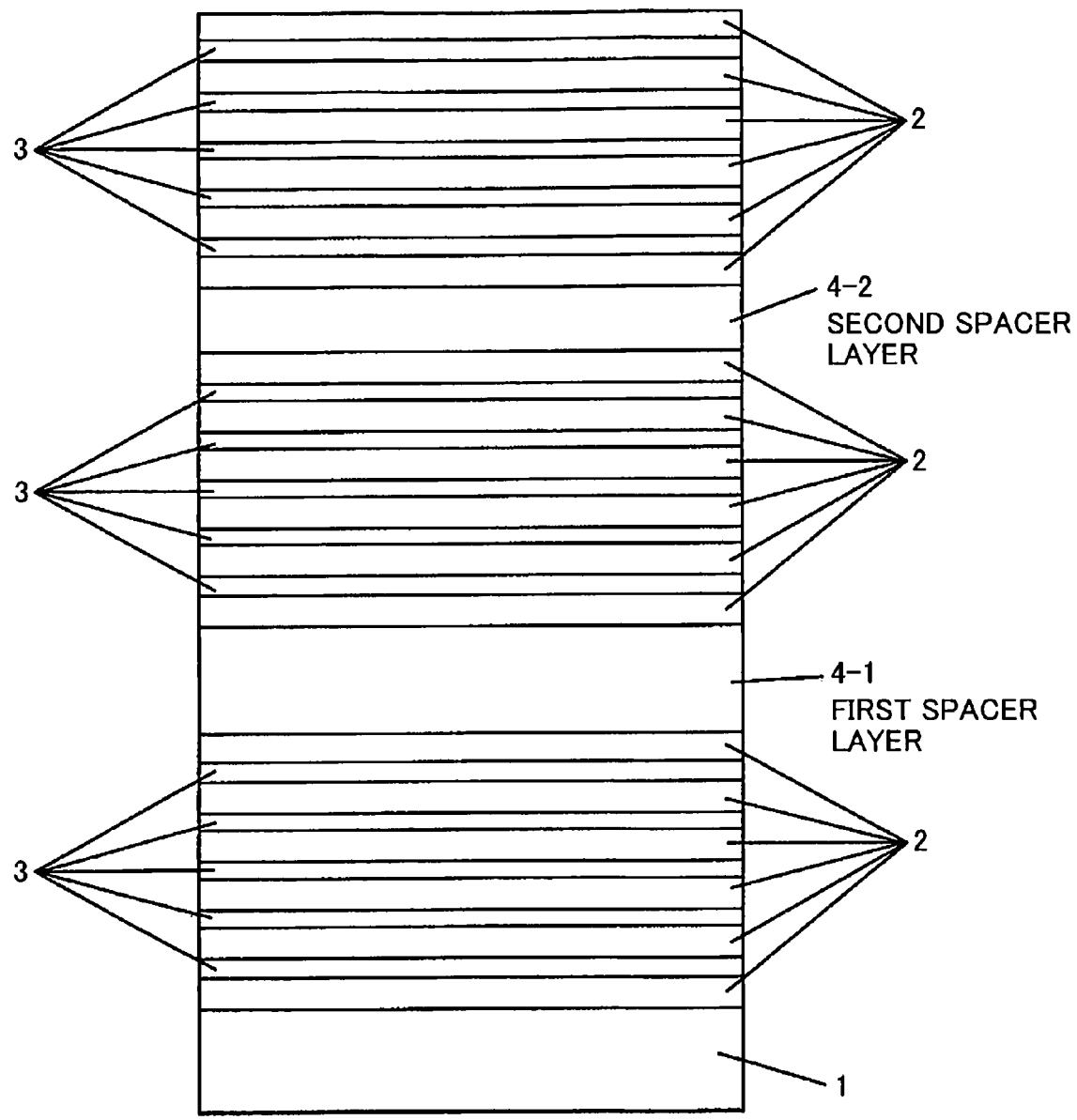
FIG. 7 is a drawing illustrating the configuration of a fifth exemplary multilayer optical information recording medium according to a fifth embodiment of the present invention.

FIG. 7 is a drawing illustrating the configuration of a fifth exemplary multilayer optical information recording medium according to a fifth embodiment of the present invention. The fifth embodiment of the present invention is described below with reference to FIG. 7. The fifth exemplary multilayer optical information recording medium has a structure similar to that of the first exemplary multilayer optical information recording medium shown in FIG. 1, except that spacer layers 4-1 and 4-2 have different thicknesses. The optical path lengths of the spacer layers 4 may be varied by changing their refractive indices instead of changing their thicknesses. Other configurations and characteristics of the fifth exemplary multilayer optical information recording medium are substantially the same as those of the first exemplary multilayer optical information recording medium. The difference in thickness between the spacer layers 4 is preferably, but not limited to, about 0 to λ/2 or more in terms of optical path length.

Figure 8:
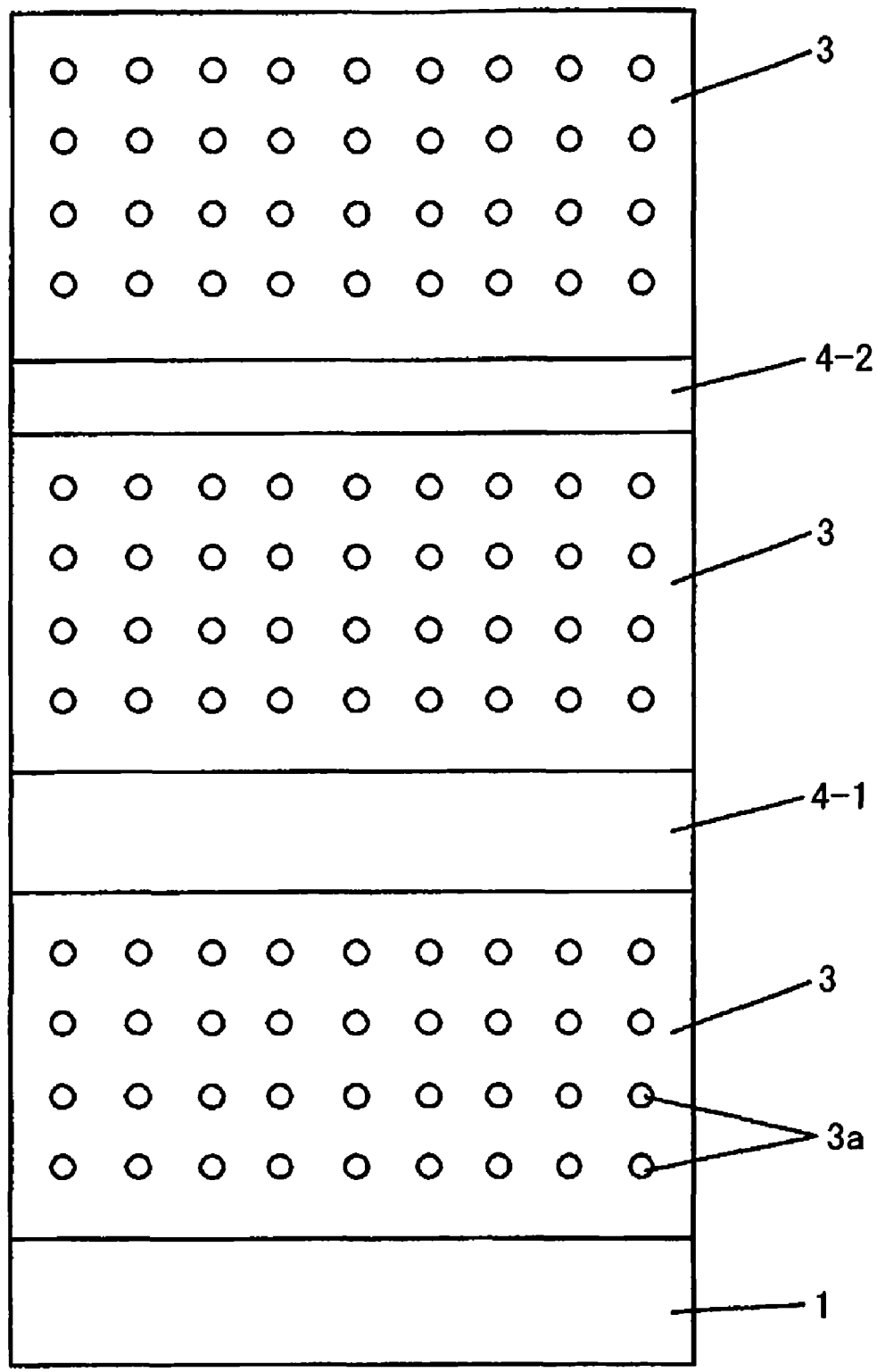
FIG. 8 is a drawing illustrating the configuration of a sixth exemplary multilayer optical information recording medium according to a sixth embodiment of the present invention.

FIG. 8 is a drawing illustrating the configuration of a sixth exemplary multilayer optical information recording medium according to a sixth embodiment of the present invention. The sixth embodiment of the present invention is described below with reference to FIG. 8. The sixth exemplary multilayer optical information recording medium has a structure similar to that of the second exemplary multilayer optical information recording medium shown in FIG. 4, except that spacer layers 4-1 and 4-2 have different thicknesses. The optical path lengths of the spacer layers 4 may be varied by changing their refractive indices instead of changing their thicknesses. Other configurations and characteristics of the sixth exemplary multilayer optical information recording medium are substantially the same as those of the second exemplary multilayer optical information recording medium. The difference in thickness between the spacer layers 4 is preferably, but not limited to, about 0 to λ/2 or more in terms of optical path length.

Figure 9:
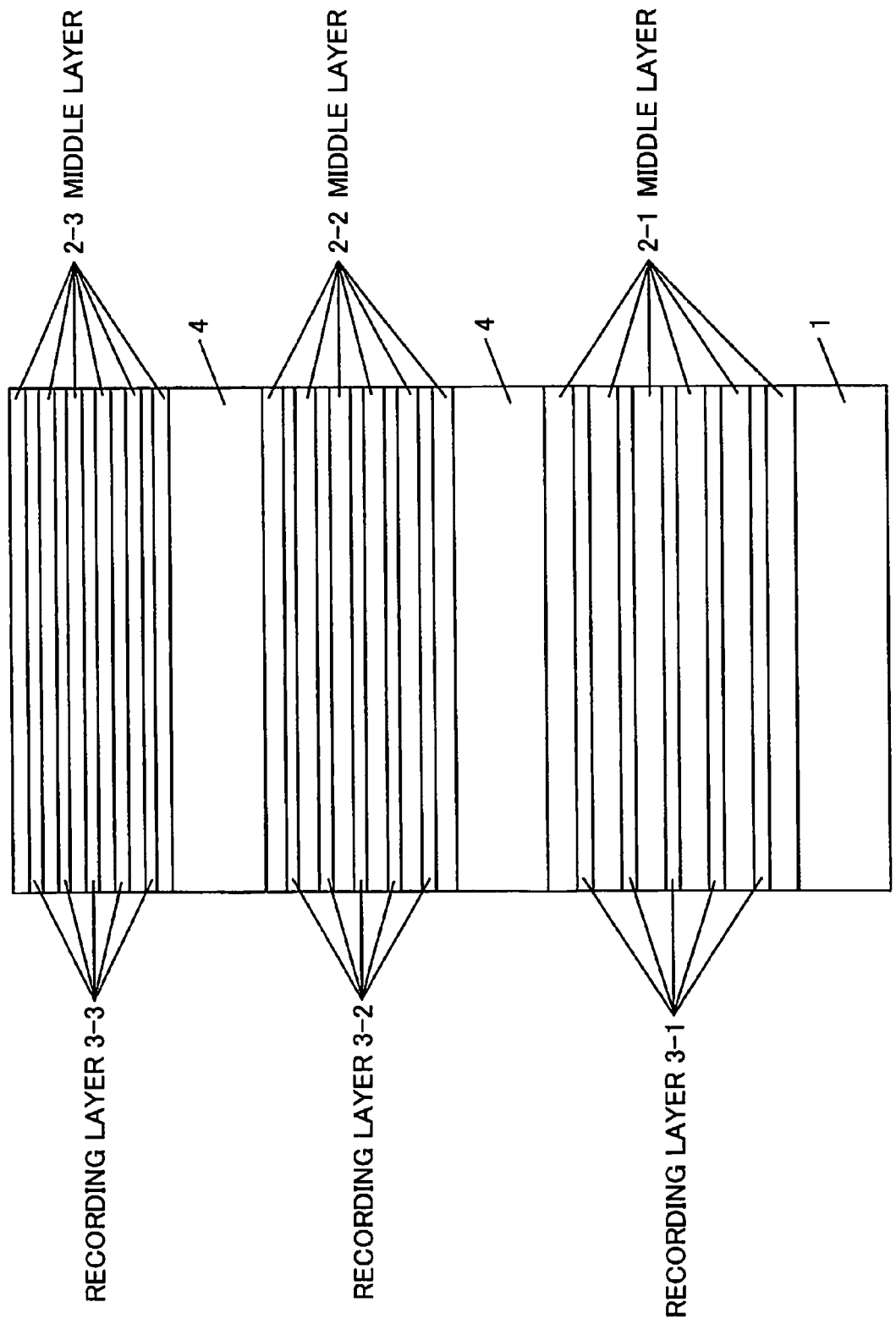
FIG. 9 is a drawing illustrating the configuration of a seventh exemplary multilayer optical information recording medium according to a seventh embodiment of the present invention.

FIG. 9 is a drawing illustrating the configuration of a seventh exemplary multilayer optical information recording medium according to a seventh embodiment of the present invention. The seventh embodiment of the present invention is described below with reference to FIG. 9. The seventh exemplary multilayer optical information recording medium has a structure similar to that of the first exemplary multilayer optical information recording medium shown in FIG. 1, except that middle layers 2-1, 2-2, and 2-3 have different thicknesses and/or recording layers 3-1, 3-2, and 3-3 have different thicknesses. The optical path lengths of the middle layers 2 and/or the recording layers 3 may be varied by changing their refractive indices instead of changing their thicknesses. Other configurations and characteristics of the seventh exemplary multilayer optical information recording medium are substantially the same as those of the first exemplary multilayer optical information recording medium. The difference in thickness between the middle layers 2 or between the recording layers 3 is preferably, but not limited to, about 0 to λ/2 or more in terms of optical path length. Also, the difference in thickness is preferably varied irregularly.

Figure 10:
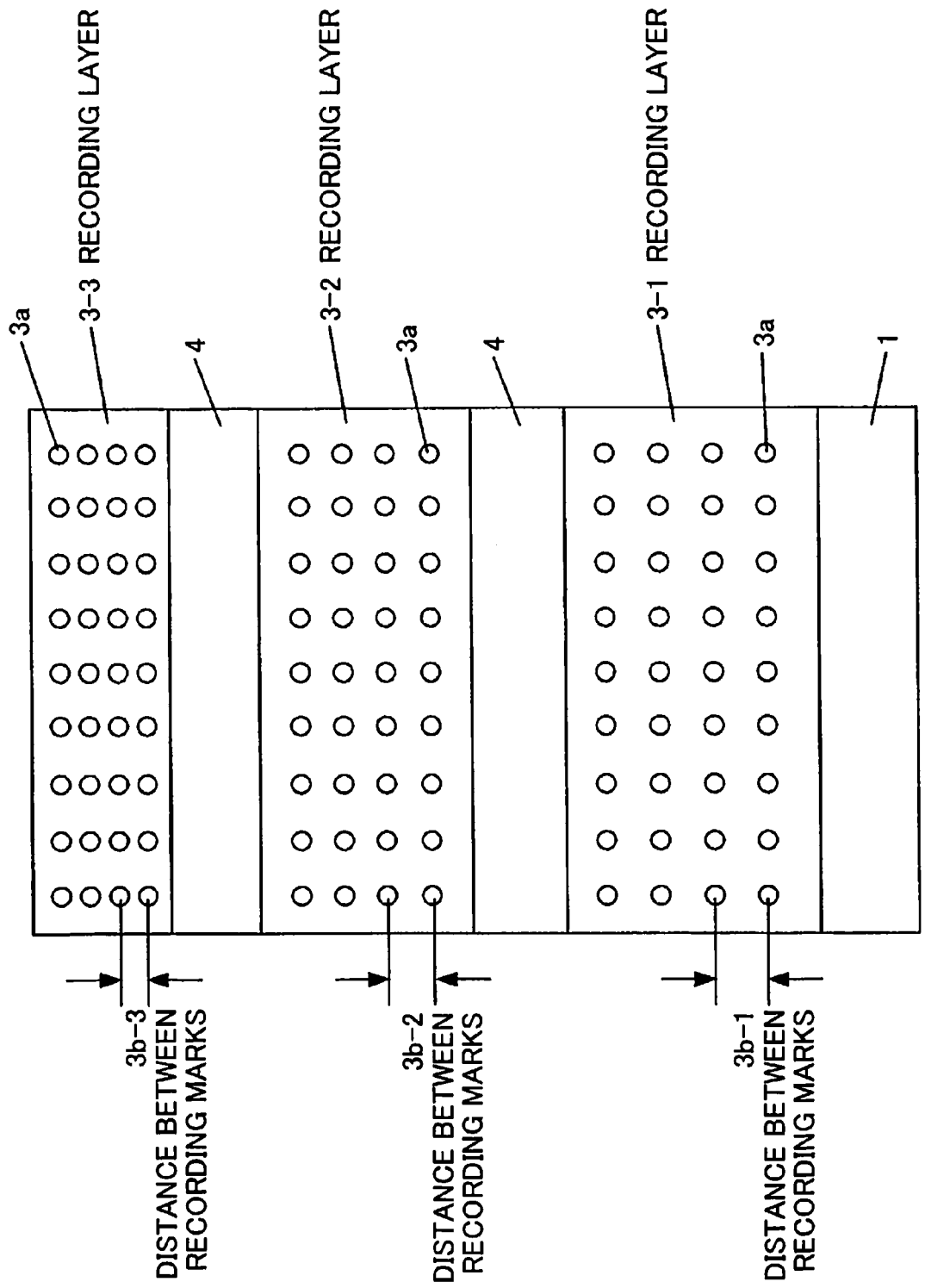
FIG. 10 is a drawing illustrating the configuration of an eighth exemplary multilayer optical information recording medium according to an eighth embodiment of the present invention.

FIG. 10 is a drawing illustrating the configuration of an eighth exemplary multilayer optical information recording medium according to an eighth embodiment of the present invention. The eighth embodiment of the present invention is described below with reference to FIG. 10. The eighth exemplary multilayer optical information recording medium has a structure similar to that of the second exemplary multilayer optical information recording medium shown in FIG. 4 except that the layers of the recording marks 3a in recording layers 3-1, 3-2, and 3-3 are arranged at different intervals 3b-1, 3b-2, and 3b-3 (distances between the layers of the recording marks 3a are different among the recording layers 3) and, as a result, the recording layers 3-1, 3-2, and 3-3 have different thicknesses. The optical path lengths of the recording layers 3 may be varied by changing their refractive indices instead of changing the intervals between the layers of the recording marks 3a. Other configurations and characteristics of the eighth exemplary multilayer optical information recording medium are substantially the same as those of the second exemplary multilayer optical information recording medium. The difference in thickness between the recording layers 3 is preferably, but not limited to, about 0 to λ/2 in terms of optical path length. Also, the difference in thickness is preferably varied irregularly.

Figure 11:
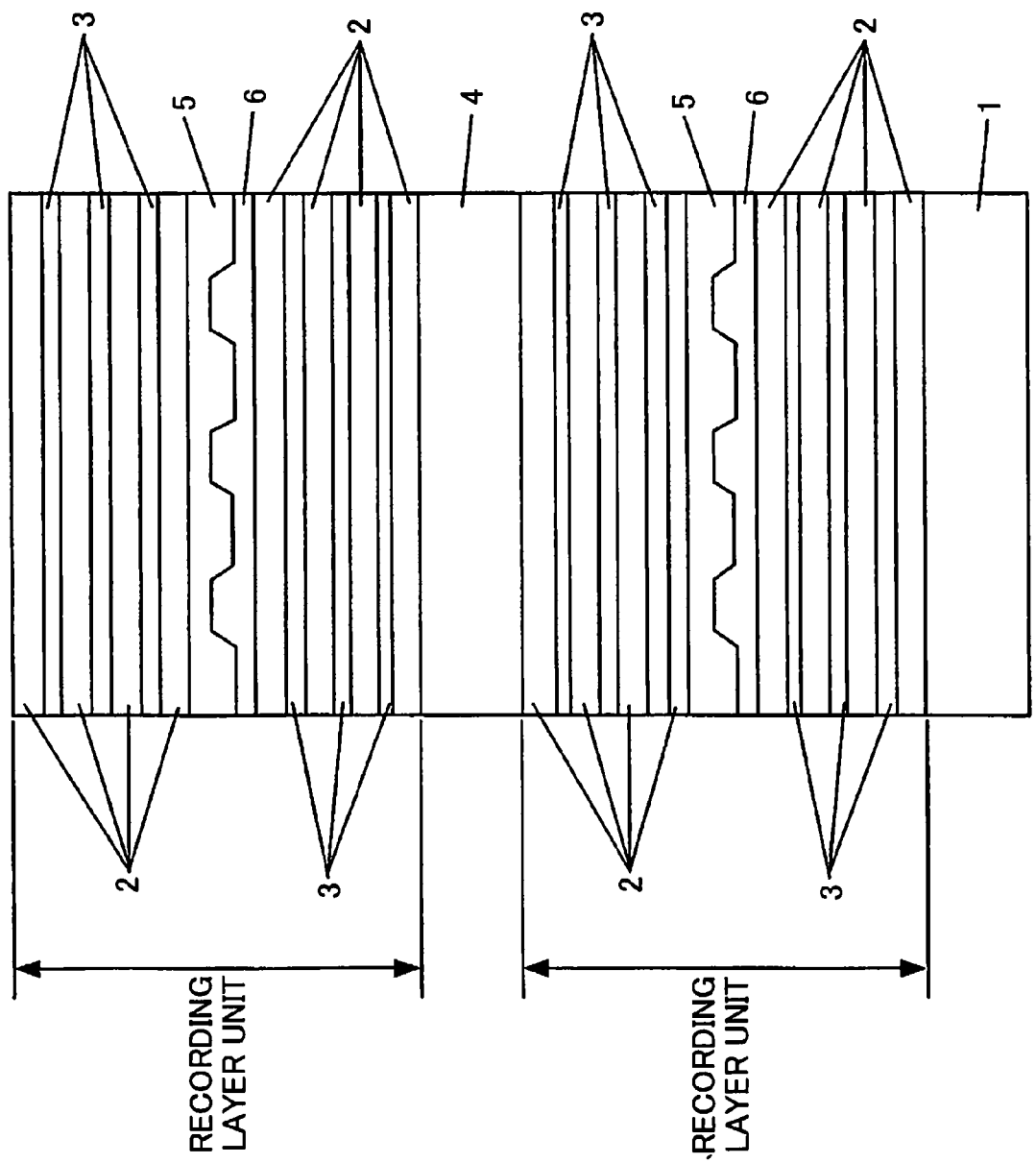
FIG. 11 is a drawing illustrating the configuration of a ninth exemplary multilayer optical information recording medium according to a ninth embodiment of the present invention.

FIG. 11 is a drawing illustrating the configuration of a ninth exemplary multilayer optical information recording medium according to a ninth embodiment of the present invention. The ninth embodiment of the present invention is described below with reference to FIG. 11. The ninth exemplary multilayer optical information recording medium has a structure similar to that of the third exemplary multilayer optical information recording medium shown in FIG. 5, except that the first adhesive layer 6 and the control layer 5 are formed in the middle of each recording layer unit composed of the middle layers 2 and the recording layers 3 rather than between the substrate 1 and the middle layer 2. As shown in FIG. 11, in the ninth exemplary multilayer optical information recording medium, the second adhesive layer 6 shown in FIG. 5 is omitted and the middle layer 2 is formed directly on the control layer 5. Other configurations and characteristics of the ninth exemplary multilayer optical information recording medium are substantially the same as those of the third exemplary multilayer optical information recording medium.

Figure 12:
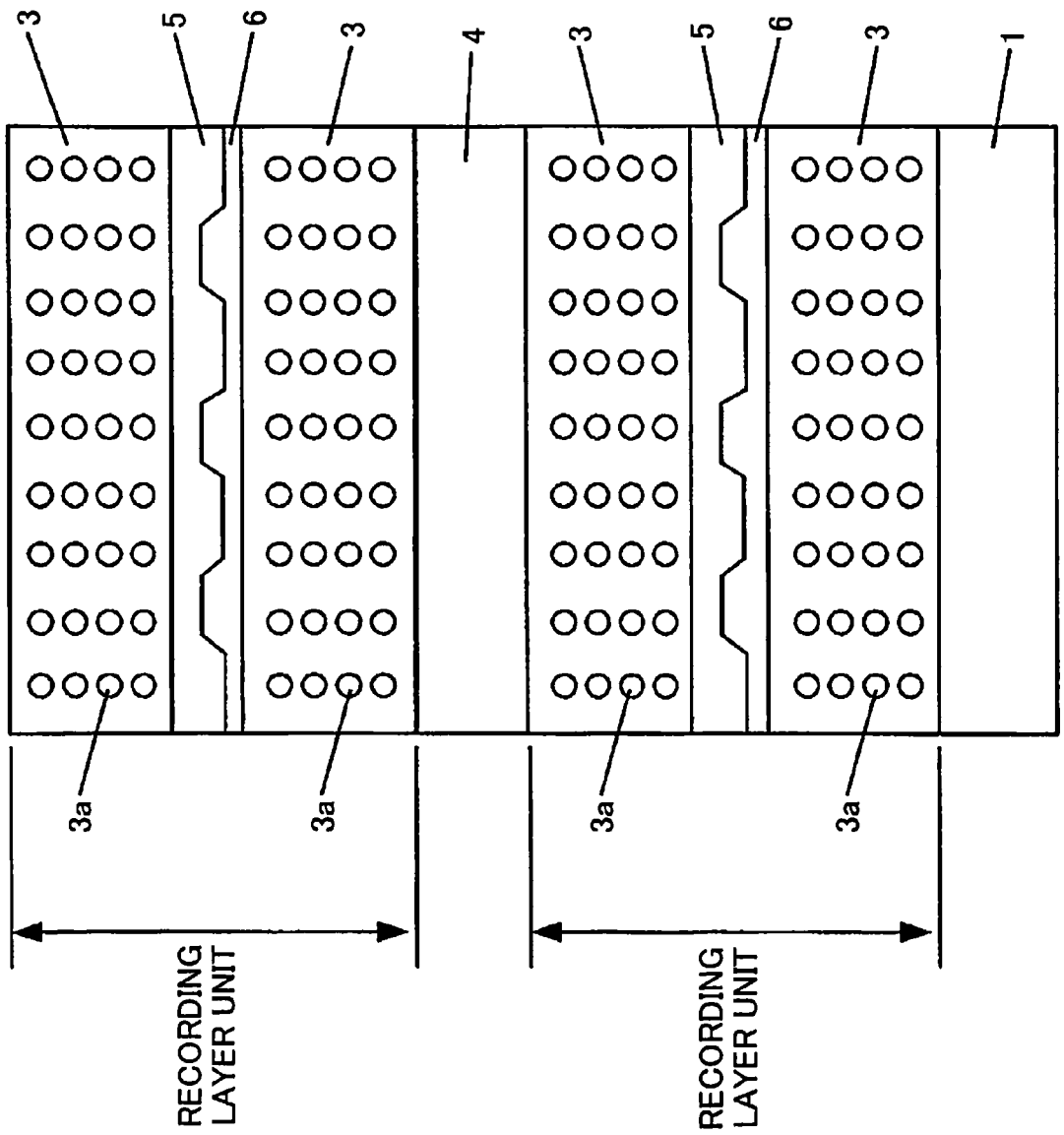
FIG. 12 is a drawing illustrating the configuration of a tenth exemplary multilayer optical information recording medium according to a tenth embodiment of the present invention.

FIG. 12 is a drawing illustrating the configuration of a tenth exemplary multilayer optical information recording medium according to a tenth embodiment of the present invention. The tenth embodiment of the present invention is described below with reference to FIG. 12. As shown in FIG. 12, the tenth exemplary multilayer optical information recording medium has a structure similar to that of the fourth exemplary multilayer optical information recording medium shown in FIG. 6, except that the first adhesive layer 6 and the control layer 5 are formed between the recording layers 3 rather than between the spacer layer 4 and the recording layer 3. In the tenth exemplary multilayer optical information recording medium, the second adhesive layer 6 is omitted and the recording layer 3 is formed directly on the control layer 5. Other configurations and characteristics of the tenth exemplary multilayer optical information recording medium are substantially the same as those of the fourth exemplary multilayer optical information recording medium.

Figure 13:
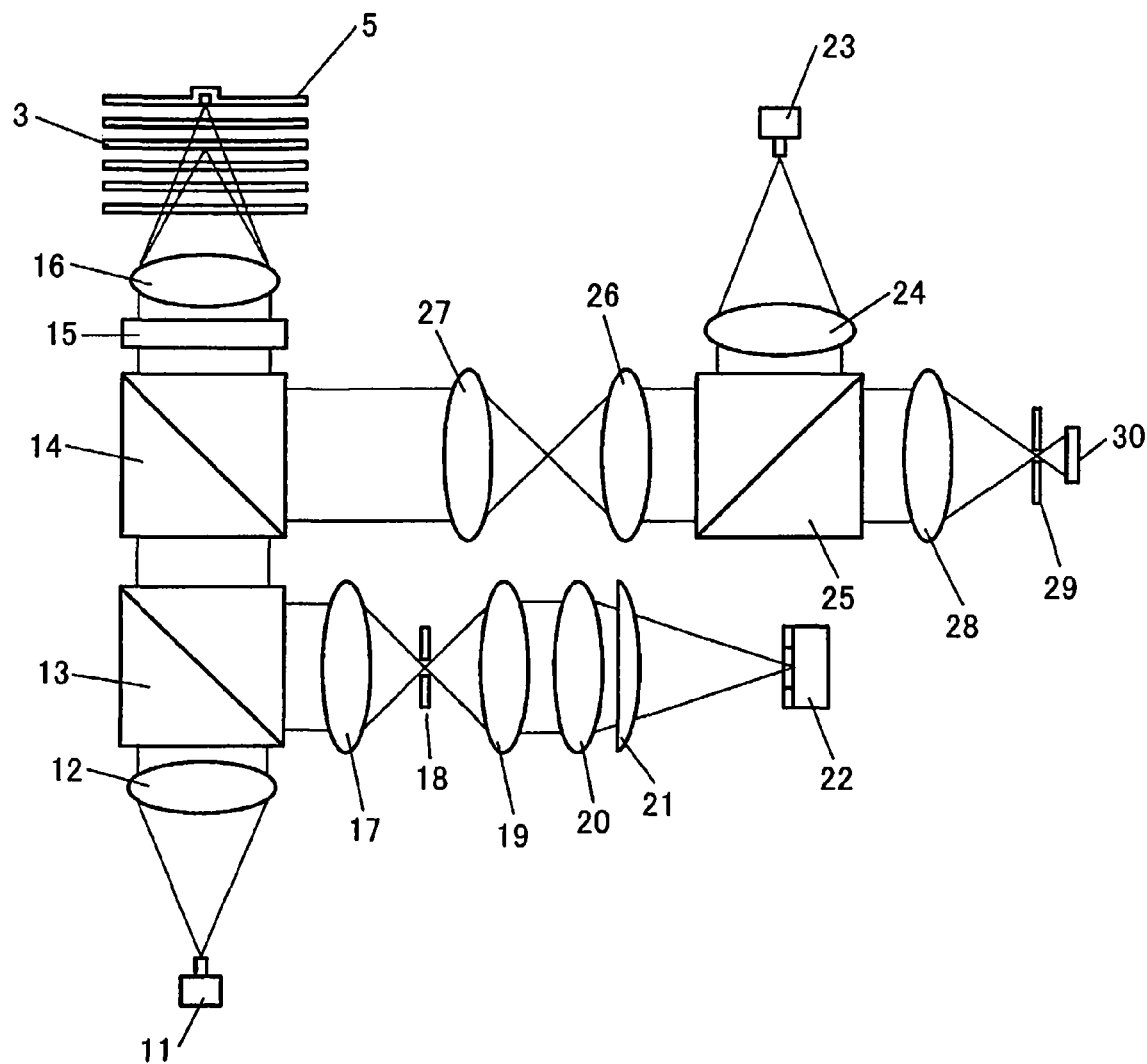
FIG. 13 is a drawing illustrating the configuration of an exemplary signal recording/reproducing apparatus according to an eleventh embodiment of the present invention for recording and reproducing a signal on a multilayer optical information recording medium according to an embodiment of the present invention.
Figure 14:
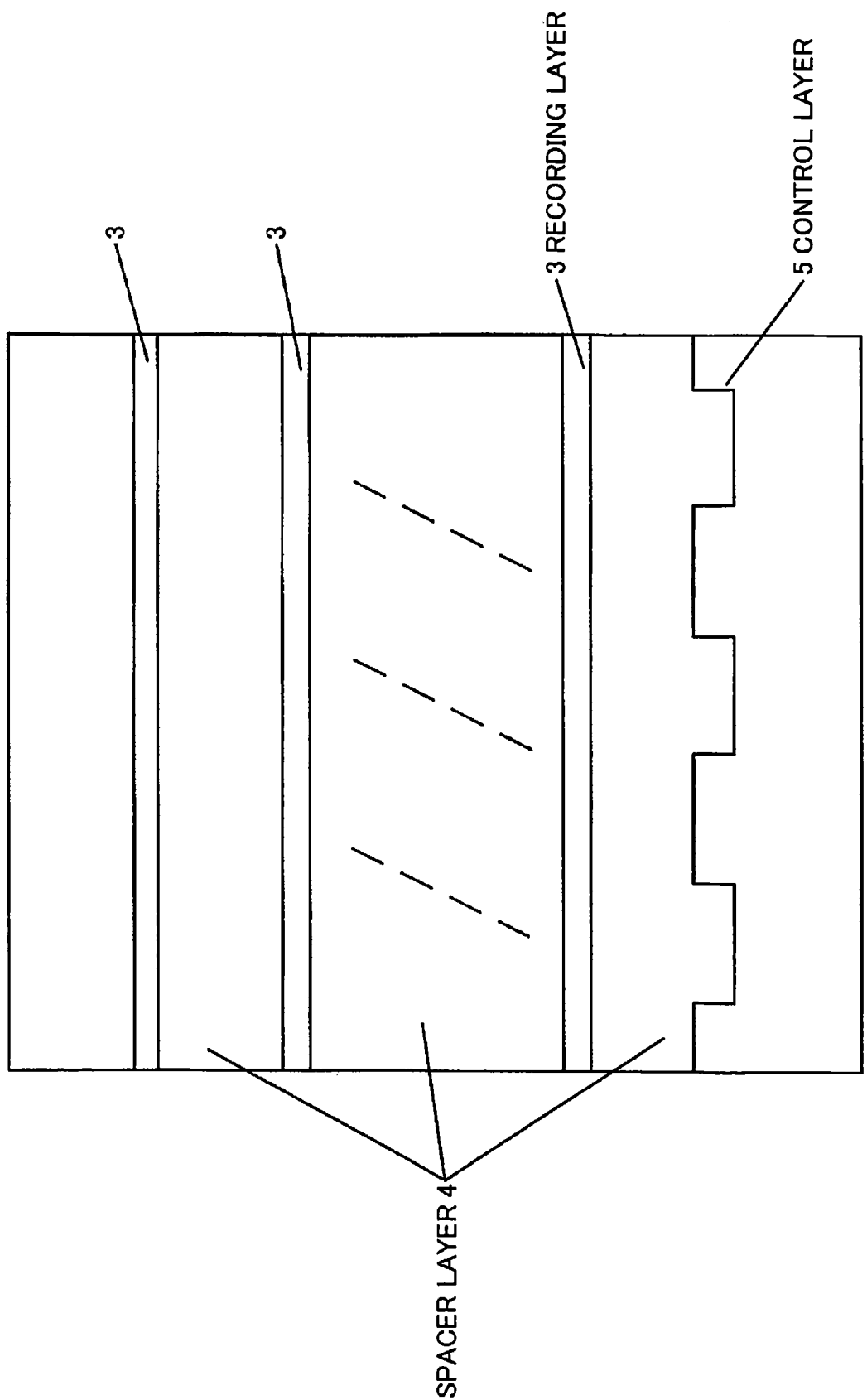
FIG. 14 is a drawing illustrating a conventional multilayer optical information recording medium.

FIG. 13 is a drawing illustrating the configuration of an exemplary signal recording/reproducing apparatus according to an eleventh embodiment of the present invention for recording and reproducing a signal on a multilayer optical information recording medium according to an embodiment of the present invention. In this embodiment, the third exemplary multilayer optical information recording medium shown in FIG. 5 is used as an exemplary optical recording medium to describe exemplary signal recording and reproduction processes by the exemplary signal recording/reproducing apparatus.

The eleventh embodiment of the present invention is described below with reference to FIG. 13. In the exemplary signal recording/reproducing apparatus shown in FIG. 13, a light beam emitted from a light source 11 (first light source) passes through a lens 12, a polarization beam splitter 13, a dichroic prism 14, a ¼ wavelength plate 15, and an objective lens 16; and is thereby focused on a track on the control layer 5 in the exemplary optical recording medium. The light beam reflected from the track on the control layer 5 passes through the objective lens 16, the ¼ wavelength plate 15, and the dichroic prism 14; is reflected by the polarization beam splitter 13; passes through a condenser lens 17, a pinhole 18 (first pinhole), condenser lenses 19 and 20, and a cylindrical lens 21; and is thereby focused on a quadrant detector 22.

Focusing a light beam with the condenser lens 20 and the cylindrical lens 21 causes astigmatism and thereby causes the focused light beam to have two focal points. The quadrant detector 22 is positioned between the two focal points. The diameter of the pinhole 18 placed between the condenser lenses 17 and 19 is, for example, slightly larger than that of the light spot formed by the condenser lens 17. This allows a light beam to pass through the pinhole 18 even when the light beam is not accurately focused on the control layer 5.

Another light beam emitted from another light source 23 (second light source) passes through a lens 24; is reflected by a polarization beam splitter 25; passes through condenser lenses 26 and 27; is reflected by the dichroic prism 14; passes through the ¼ wavelength plate 15 and the objective lens 16; and is thereby focused on the recording layer 3 in the exemplary optical recording medium. A positioning mechanism such as a coil is provided for the objective lens 16 to adjust the position of the objective lens 16.

The light beam reflected from the recording layer 3 passes through the objective lens 16 and the ¼ wavelength plate 15; is reflected by the dichroic prism 14; passes through the condenser lenses 27 and 26, the polarization beam splitter 25, a condenser lens 28, and a pinhole 29 (second pinhole); and is thereby focused on a photodetector 30.

The light source 23 and the pinhole 29 are placed in confocal positions. The condenser lenses 26 and 27 form a beam expander and function as a positioning mechanism. The focal point of a light beam in the exemplary optical recording medium can be changed by changing the positions of the condenser lenses 26 and 27 along the optical axis. In other words, the focal point of a light beam from the light source 23 can be adjusted along the optical axis by changing the distance between the condenser lenses 26 and 27. The diameter of the pinhole 29 is preferably equal to or around that of a light spot formed by the condenser lens 28.

In the exemplary signal recording/reproducing apparatus as described above, a light beam emitted from the light source 11 is focused on a track on the control layer 5 and the distance between the condenser lenses 26 and 27 is adjusted so that a light beam emitted from the light source 23 is focused on a point that is a specific distance away along the optical axis from the focal point of the light beam emitted from the light source 11. This mechanism makes it possible to focus the light beam emitted from the light source 23 on a specific recording layer 3. Also, as described above, the light beam emitted from the light source 11 is reflected by the track and enters the quadrant detector 22, and the quadrant detector 22 generates a signal. Based on the signal generated by the quadrant detector 22, a focus error signal is obtained by an astigmatism method and a track error signal is obtained by a push-pull method. The obtained signals are used to control the position of the objective lens 16.

The exemplary signal recording/reproducing apparatus may also be configured to include multiple sets of the light source 23 and the photodetector 30 and thereby to record and reproduce information on multiple recording layers 3 using multiple light beams. Further, the exemplary signal recording/reproducing apparatus may be configured to include multiple sets of the light source 11 and the quadrant detector 22 and thereby to simultaneously perform focus servo control for plural recording layers 3. In this case, a dynamic focusing unit such as a liquid crystal focusing element is necessary in the exemplary signal recording/reproducing apparatus.

A twelfth embodiment of the present invention is described below. According to the twelfth embodiment of the present invention, the control layer 5 in the third or ninth exemplary multilayer optical information recording medium is configured to store information on the arrangement of the recording layers 3 and the middle layers 2 in a corresponding recording layer unit and information on the locations of the recording layers 3 and the middle layers 2 in the medium. Also, the control layer 5 in the fourth or tenth exemplary multilayer optical information recording medium is configured to store information on the horizontal and vertical arrangements of the recording marks 3a in a corresponding recording layer 3 and information on the locations of the recording marks 3a in the medium.

The above information can be recorded by physically forming lands and pits on the control layer 5 at the same time when grooves used for tracking are formed on the control layer 5. Other configurations and characteristics of the exemplary multilayer optical information recording media according to the twelfth embodiment are substantially the same as those of the exemplary multilayer optical information recording media according to other embodiments.

In a multilayer optical information recording medium according to an embodiment of the present invention, the total number of the recording layers 3 is preferably from several tens to several hundreds, and the number of layers in a recording layer unit is preferably from several to 100. When materials and specifications of a product are taken into account, the thickness of the recording layer 3 and the middle layer 2 is preferably from 0.1 μm to several tens of $\lambda$m, and the thickness of the spacer layer 4 is preferably between 1 and about 100 μm. Also, the thickness of the middle layer 2 is preferably equal to or larger than that of the recording layer 3.

An embodiment of the present invention provides a multilayer optical information recording medium that makes it possible to reduce the fluctuation in the amount of reflected light in recording or reading a signal even when the wavelength or incidence angle of the light varies and thereby to prevent the S/N ratio from decreasing; and to accurately position a laser beam even when the number of recording layers is large. Such a multilayer optical information recording medium is suitable, for example, to be used with an optical disk filing system or an optical information recording/reproducing apparatus for recording information such as video data.

According to an embodiment of the present invention, a multilayer optical information recording medium includes multiple recording layer units in each of which one or more recording layers and one or more middle layers are stacked alternately; and one or more spacer layers; wherein the recording layer units and the spacer layers are stacked alternately in a depth direction of the optical recording medium. The spacer layers make it possible to control and optimize the optical phase change between the multiple recording layer units and thereby to reduce the fluctuation in reflectance or in the amount of reflected light even when the wavelength or incidence angle of the light varies.

According to an embodiment of the present invention, a multilayer optical information recording medium includes multiple recording layers treated as recording layer units in each of which recording marks each having a refractive index different from that of a surrounding area are arranged so as to form multiple layers of the recording marks, wherein the recording marks in each of the layers of the recording marks are horizontally arranged at intervals and the layers of the recording marks are vertically arranged at intervals; and one or more spacer layers; wherein the recording layers and the spacer layers are stacked alternately in a depth direction of the optical recording medium. In such a multilayer optical information recording medium, varying the thicknesses or refractive indices of the spacer layers or varying the vertical distances between the layers of the recording marks among the recording layers makes it possible to change relative phase of light when the light is transmitted through the layers. This, in turn, makes it possible to reduce the fluctuation in reflectance or in the amount of reflected light by mutual interference even when the wavelength or incidence angle of the light varies.

A multilayer optical information recording medium according to embodiments of the present invention may also include a control layer used for tracking for each of the recording layer units and/or an adhesive or pressure-sensitive adhesive layer. Further, the control layer may be configured to store information on the arrangements of layers or recording marks in a corresponding one of the recording layer units and information on locations of the layers or the recording marks in the optical recording medium. Such configurations make it possible to perform tracking accurately for each of the recording layer units and to process the control layer with various methods.

Figure 15:
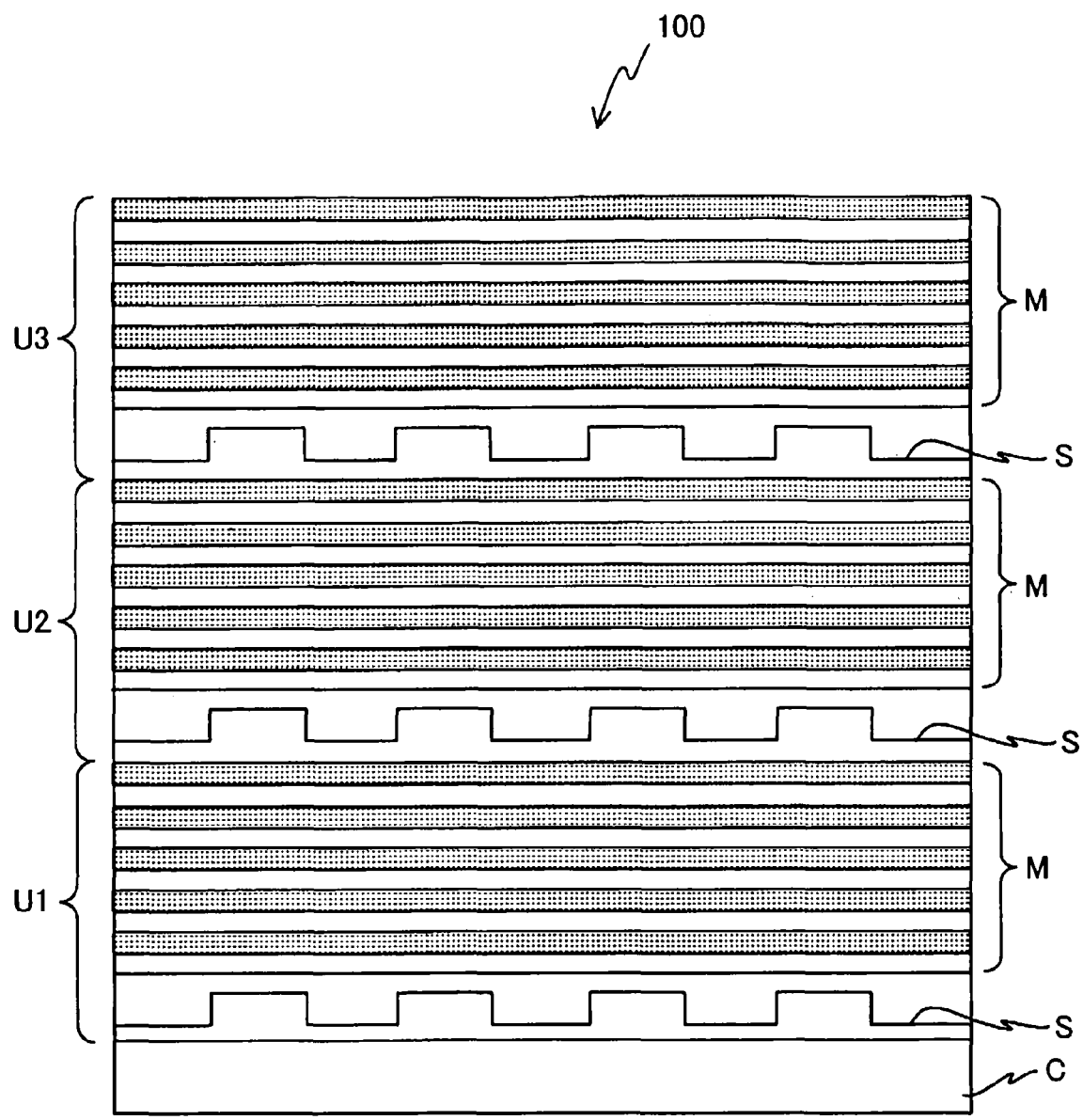
FIG. 15 is a drawing illustrating an exemplary structure of an optical disk 100 that is a multilayer optical information recording medium according to an embodiment of the present invention.

An embodiment of the present invention is descried below with reference to FIGS. 15 through 24. FIG. 15 is a drawing illustrating an exemplary structure of an optical disk 100 that is a multilayer optical information recording medium according to an embodiment of the present invention.

As shown in FIG. 15, the optical disk 100 includes a cover layer C and three multilayer units (U1, U2, and U3) stacked on the cover layer C. In FIG. 15, the Z direction indicates a direction along the thickness of the optical disk 100 (upward direction in FIG. 15). A laser beam LB is emitted from a light source positioned upstream of the optical disk 100 in the Z direction.

The cover layer C is the lowest layer of the optical disk 100. Therefore, the laser beam LB is incident on the lower surface of the cover layer C (the lower surface of the cover layer C is the incidence plane). The multilayer unit U1 is stacked on the upper surface of the cover layer C, the multilayer unit U2 is stacked on the upper surface of the multilayer unit U1, and the multilayer unit U3 is stacked on the upper surface of the multilayer unit U2.

Each of the multilayer units U1 through U3 includes a guide track layer S and an information layer M.

The guide track layer S corresponds to light with a wavelength between 390 and 420 nm. Guide grooves (or tracks) are formed spirally or concentrically on the guide track layer S. Also, the guide tracks are formed so as to wobble at intervals.

Figure 16:
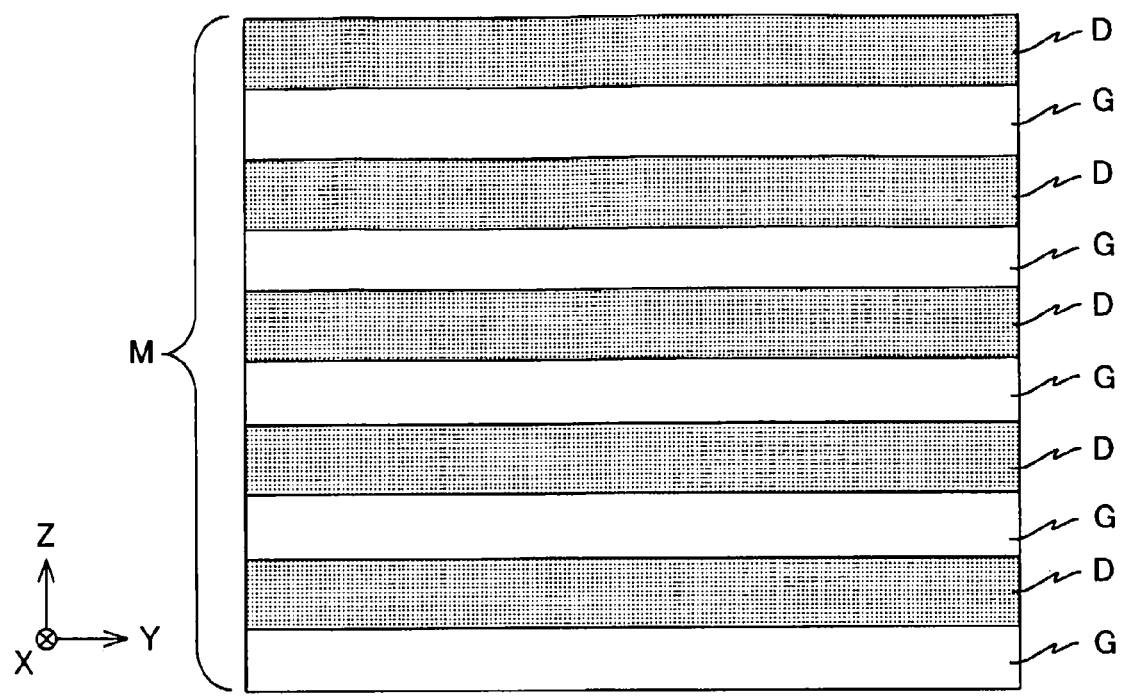
FIG. 16 is a drawing illustrating an information layer M in the optical disk 100 shown in FIG. 15.

As shown in FIG. 16, the information layer M is positioned downstream of the guide track layer S in the Z direction and is composed of five recording layers D and five resin layers G stacked alternately. In other words, one guide track layer S is provided for five recording layers D. Also, in each of the multilayer units, the guide track layer S is positioned closer to the incidence plane than the recording layers D.

Each of the recording layers D is made of a two-photon absorption material that is suitable for light with a wavelength between 650 and 680 nm. Information is recorded on the recording layer D in a photon mode. Examples of two-photon absorption materials include photorefractive crystal, photopolymer, and photochromic materials.

Figure 17:
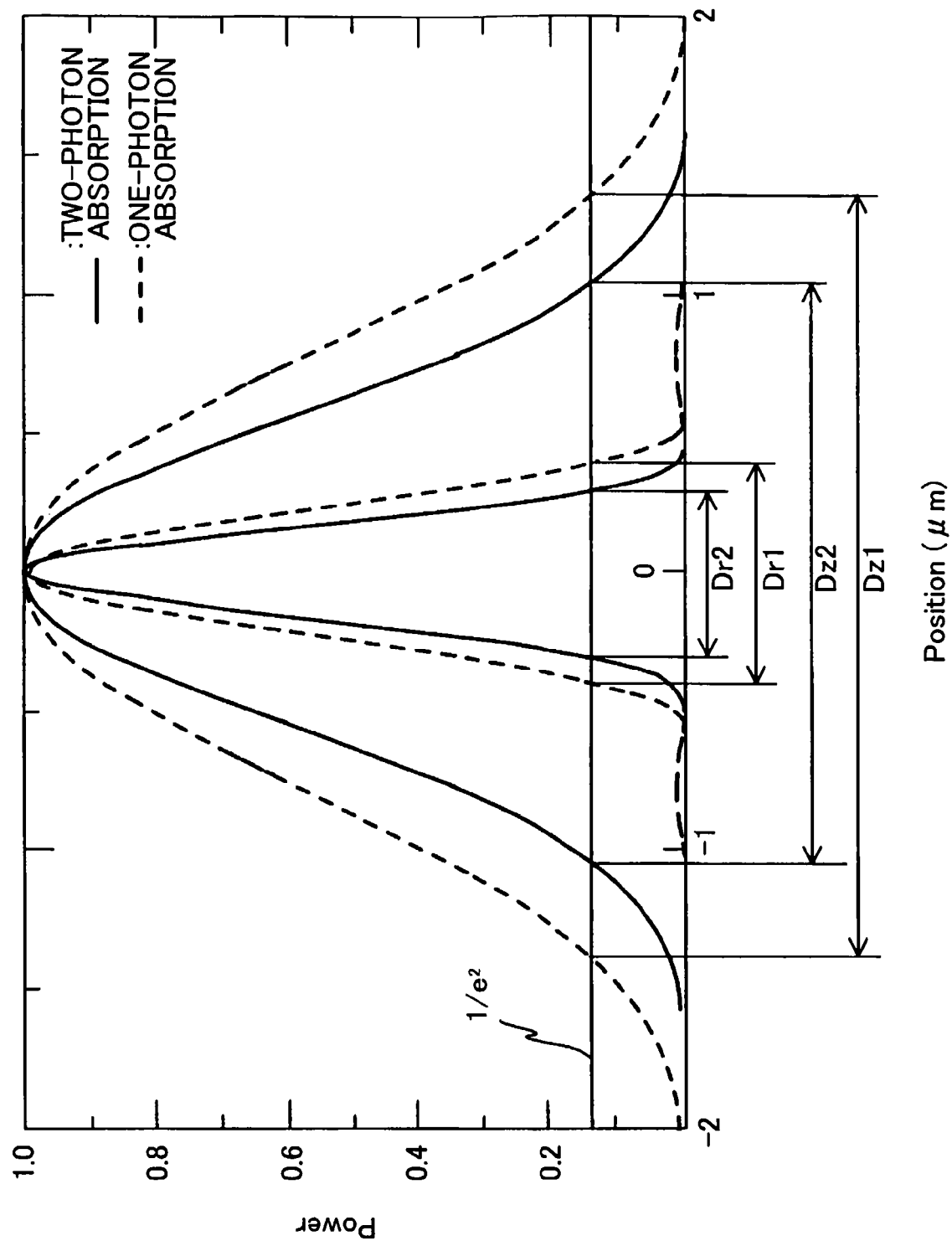
FIG. 17 is a graph showing sizes of pits formed by two-photon absorption and sizes of pits formed by a conventional method.

In a photon-mode recording, the refractive index of an area exposed to a light spot changes in proportion to the light intensity distribution of the light spot. Therefore, the diameter of a spot formed by photon-mode recording is about 0.71 (=1/√2) times as large as that of a spot formed by normal recording. For example, as shown in FIG. 17, a pit recorded by two-photon absorption (length: Dz2, width: Dr2) is smaller than a pit recorded by normal one-photon absorption (length: Dz1, width: Dr1). Therefore, two-photon absorption recording makes it possible to record information at a recording density higher than in one-photon absorption recording even when light with a same light source wavelength is used (see "Two-photon absorption recording on photochromic material using laser diode", Teruhiro Shiono, OPTRONICS, July 2005, No. 28, p 174, published by the Optronics Co., Ltd.). In other words, two-photon absorption recording makes it possible to increase the storage capacity of an optical disk. Each value on the horizontal scale of the graph in FIG. 17 indicates a distance from the center of a pit.

As described above, one way to increase the storage capacity of an optical disk is to increase the number of recording layers in the optical disk. At the same time, it is important to increase the storage capacity of each recording layer. To increase the storage capacity of each recording layer, it is preferable to record information at a high density using light with a wavelength as short as possible. However, at the current state of technology, it is difficult to find a two-photon absorption material suitable for blue light. Therefore, it is preferable to use a two-photon absorption material suitable for green light or red light. Since green-light emitting laser diodes are not being mass-produced currently, in this embodiment, a two-photon absorption material suitable for red light is used for the recording layer D. Even with red light, a spot with a diameter about 0.71 (=1/√2) times as large as that of a spot formed by one-photon absorption recording can be formed on the recording layer D and therefore information can be recorded at a density as high as that possible with blue light.

The guide track layer S contains no two-photon absorption material. Since two-photon absorption materials degrade when they are exposed to light in the spectrum from blue to ultraviolet, it is preferable not to use two-photon absorption material for a layer that is, for example, irradiated with an ultraviolet ray in a production process (for example, 2P process) for curing an ultraviolet curing resin or an adhesive.

As described above, the guide track layer S contains no two-photon absorption material. Therefore, if red light for the recording layer D is also used for the guide track layer S, the diameter of a spot cannot be reduced to a satisfactory level and it becomes difficult to increase the storage capacity per recording layer. Generally, the diameter of a spot is proportional to a value obtained by the following formula: wavelength/numerical aperture (NA) of lens. Therefore, even on a layer with no two-photon absorption material, the diameter of a spot can be reduced by using light with a short wavelength. In this embodiment, blue light, which has a wavelength shorter than that of light used to irradiate the recording layer D, is used to irradiate the guide track layer S. Using blue light makes it possible to narrow the pitch between tracks (track pitch) on the guide track layer S and thereby makes it possible to increase the storage capacity per recording layer. And the increased storage capacity per recording layer, in turn, makes it possible to increase the storage capacity of an optical disk. Also, a narrower track pitch makes it possible to accurately perform servo control on a high-density recording medium.

Meanwhile, forming a guide track layer S and multiple recording layers D as a multilayer unit improves the tilt tolerance of an optical disk. Take, for example, an information layer M including five recording layers each having a thickness of 3 μm (the total thickness of the information layer M is 3 μm×5=15 μm). In this case, even when the optical disk 100 is tilted 1 degree in relation to the incidence angle of light, the focal point of the light is shifted only 0.26 μm. With an optical disk having the above structure, even when the track pitch is as narrow as 0.32 μm like a Blu-ray disk, the focal point of the light may not be shifted out of a target track and therefore information can be recorded/reproduced reliably by performing conventional tilt control. In other words, the optical disk 100 satisfies the condition expressed by formula (1) shown below. In formula (1), n indicates the number of recording layers in each multilayer unit, d indicates the thickness of each recording layer, and p indicates a track pitch.

$$n \times d \times \sin(1°) < p \quad (1)$$

In summary, an optical disk with a structure where the guide track layers S and the information layers M are stacked alternately provides, even when the optical disk includes a large number of recording layers, a tilt tolerance that is substantially equal to that of an optical disk having only a few recording layers and thereby makes it possible to stably and reliably record/reproduce information.

An exemplary configuration of an optical pickup 123 that is an optical head according to an embodiment of the present invention is described below with reference to FIGS. 18 through 21.

Figure 18:
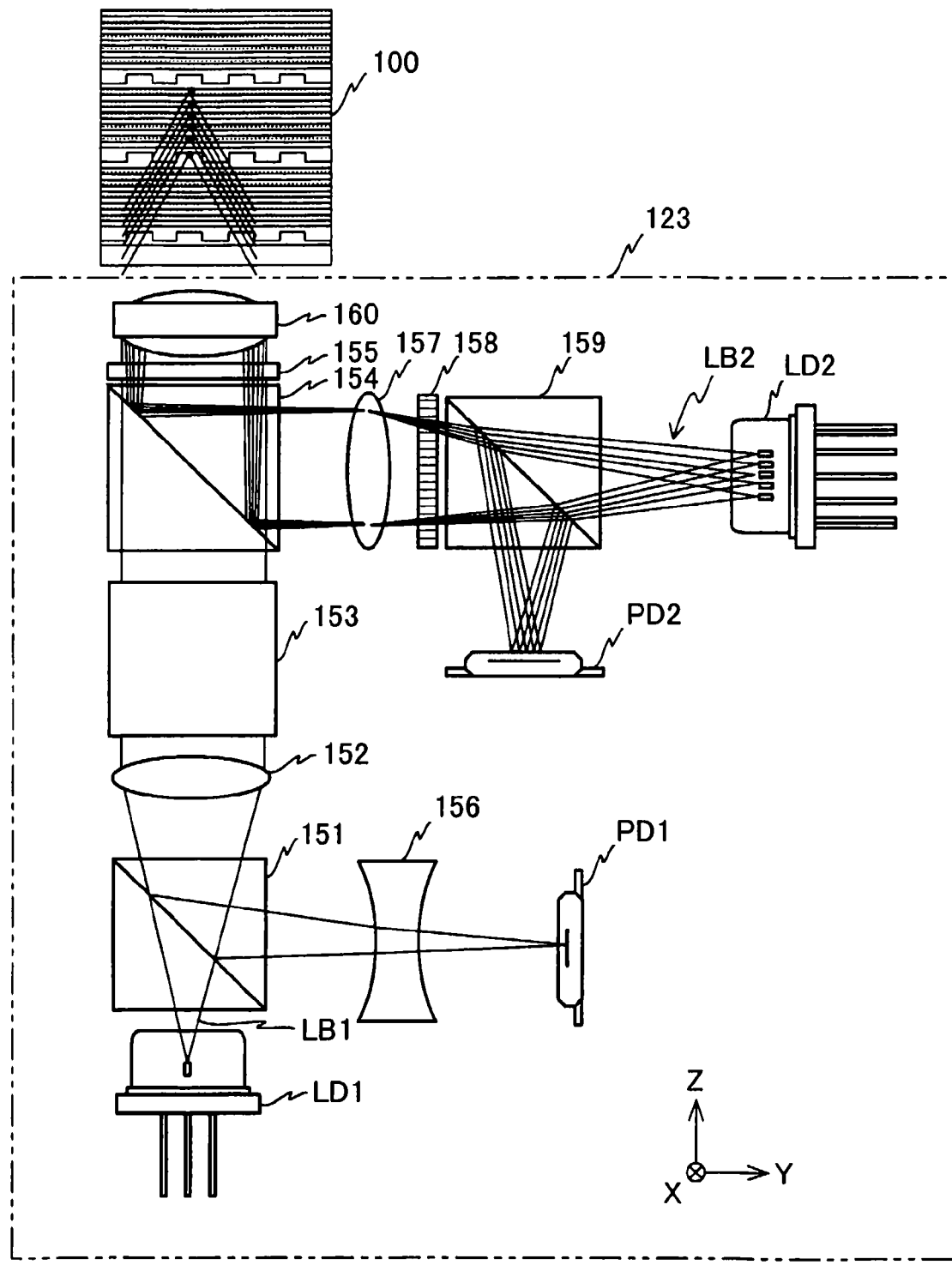
FIG. 18 is a drawing illustrating the configuration of an exemplary optical pickup that is an optical head according to an embodiment of the present invention.

As shown in FIG. 18, the optical pickup 123 includes a light source LD1, a polarization beam splitter 151, a collimator lens 152, an aberration correction optical element 153, a dichroic prism 154, a ¼ wavelength plate 155, an objective lens 160, a light source LD2, a detection lens 156, a photodetector PD1, a half mirror 159, a diffractive-optical element 158, a collimator lens 157, photodetector PD2, and a driving mechanism (not shown) for driving the objective lens 160.

The light source LD1 includes a laser diode that emits light with a wavelength of about 405 nm. The light source LD1 emits light at its maximum intensity in the Z direction. The light emitted from the light source LD1 is, for example, p-polarized. Hereafter, the light emitted from the light source LD1 is also called a "servo beam".

The polarization beam splitter 151 is positioned downstream of the light source LD1 in the Z direction. The reflectance of the polarization beam splitter 151 differs depending on the polarization state of an incoming light. In this embodiment, for example, the reflectance of the polarization beam splitter 151 is low for a p-polarized light and high for an s-polarized light. Therefore, most of the servo beam emitted from the light source LD1 can pass through the polarization beam splitter 151.

The collimator lens 152 is positioned downstream of the polarization beam splitter 151 in the Z direction and substantially collimates the servo beam from the polarization beam splitter 151.

The aberration correction optical element 153 is positioned downstream of the collimator lens 152 in the Z direction and corrects the aberration of an incoming light beam.

The light source LD2 includes a laser diode array having at least five light-emitting parts each of which emits light with a wavelength of about 660 nm. The light source LD2 emits five light beams in the -Y direction. The five light beams emitted from the light source LD2 are, for example, p-polarized. Hereafter, the light beams emitted from the light source LD2 are also called "recording/reproducing beams".

The half mirror 159 is positioned downstream of the light source LD2 in the -Y direction and bends the light path of a part of an incoming light beam at right angles.

The diffractive-optical element 158 is positioned downstream of the half mirror 159 in the -Y direction and diffracts an incoming light. The light paths of the five recording/reproducing beams from the half mirror 159 are changed by the diffractive-optical element 158 so that their light axes join and their divergence angles differ from each other.

The collimator lens 157 is positioned downstream of the diffractive-optical element 158 in the -Y direction and substantially collimates the five recording/reproducing beams from the diffractive-optical element 158. However, since the five recording/reproducing beams from the diffractive-optical element 158 have different divergence angles, each of the beams from the collimator lens 157 becomes parallel, slightly divergent, or slightly convergent.

The dichroic prism 154 is positioned downstream of the aberration correction optical element 153 in the Z direction and downstream of the collimator lens 157 in the -Y direction. The dichroic prism 154 bends the light path of light with a wavelength of about 660 nm (a recording/reproducing beam) at right angles.

The ¼ wavelength plate 155 is positioned downstream of the dichroic prism 154 in the Z direction and gives an optical phase difference of a ¼ wavelength to an incoming light.

Figure 19:
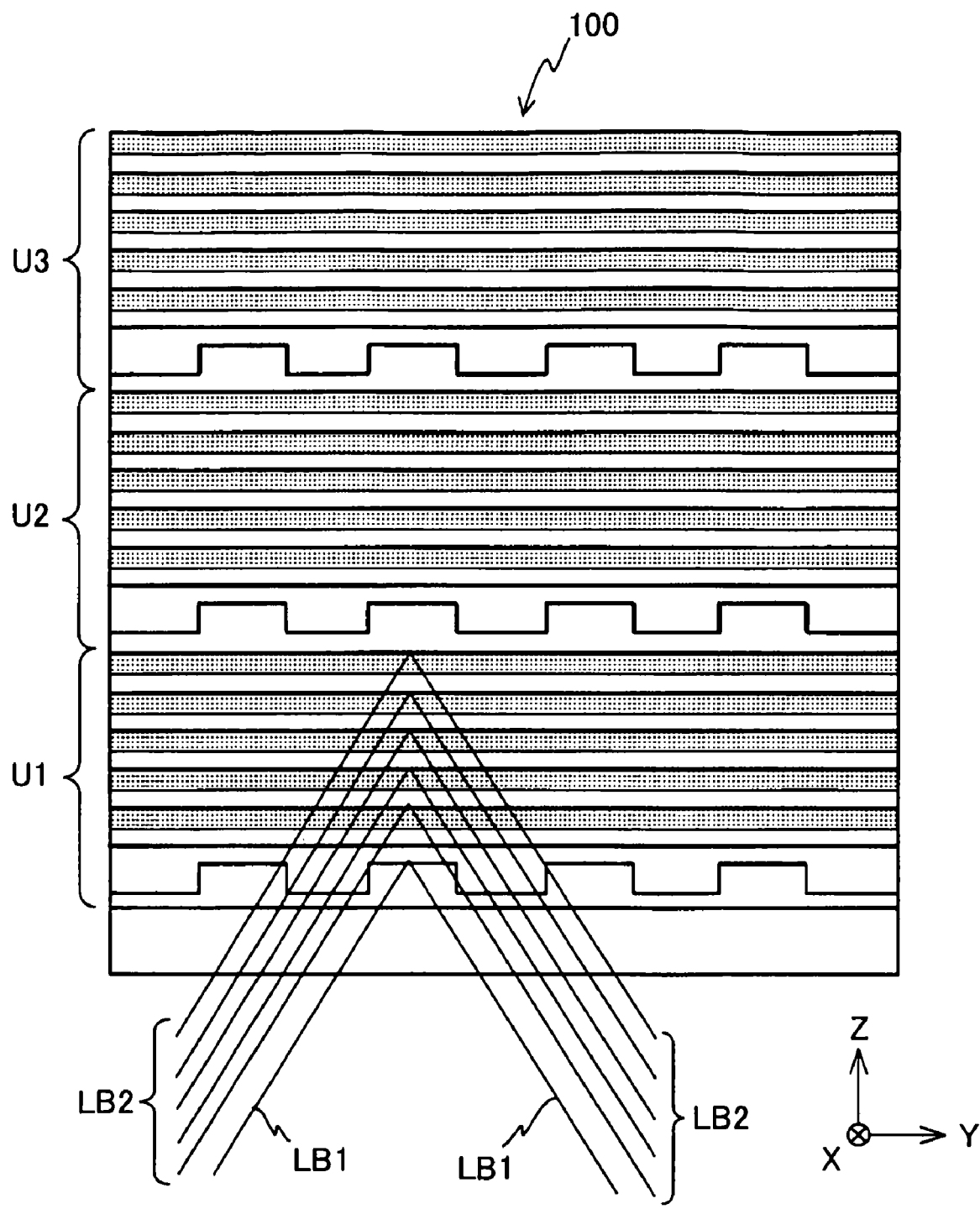
FIG. 19 is a drawing used to describe the exemplary optical pickup shown in FIG. 18.
Figure 20:
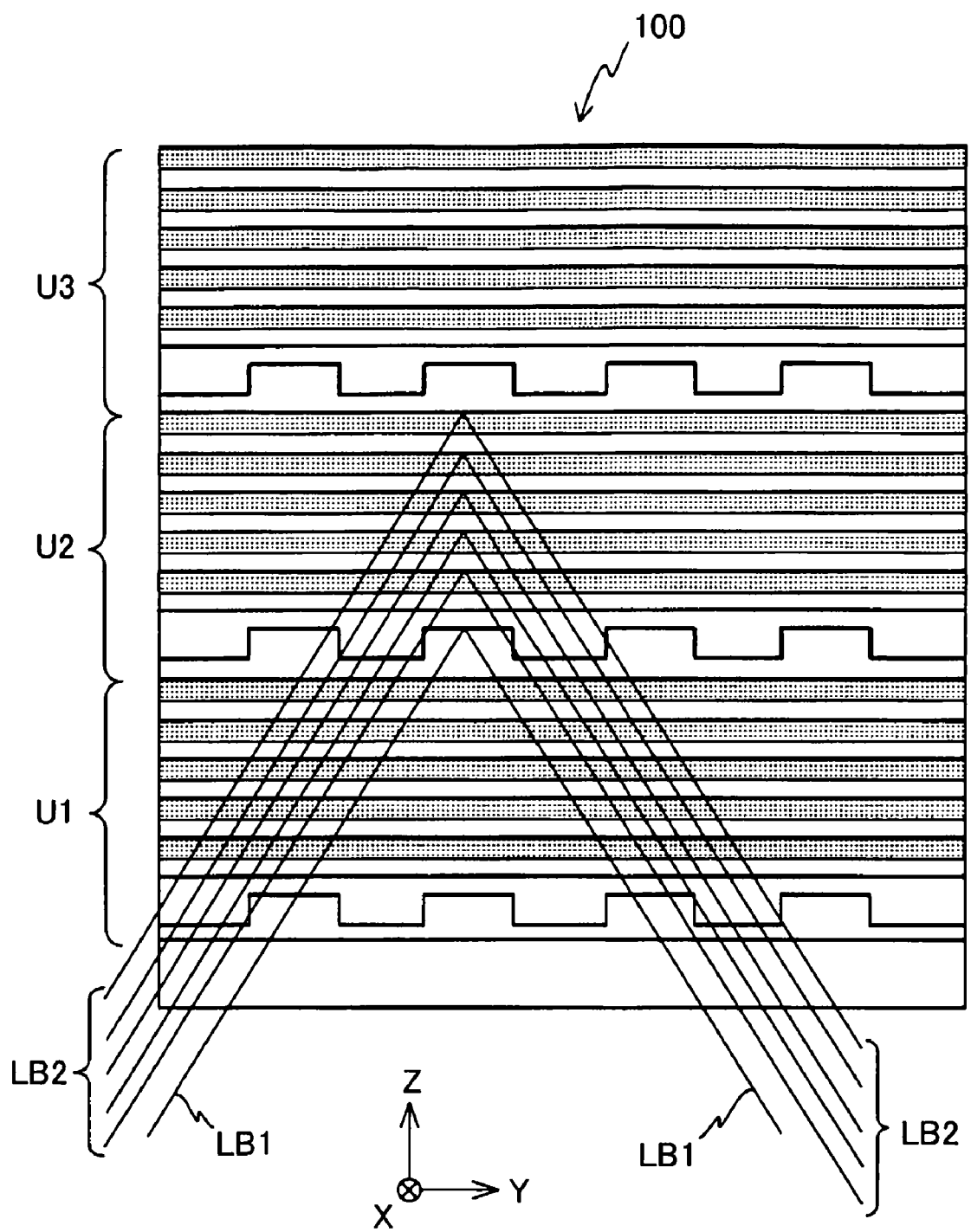
FIG. 20 is another drawing used to describe the exemplary optical pickup shown in FIG. 18.
Figure 21:
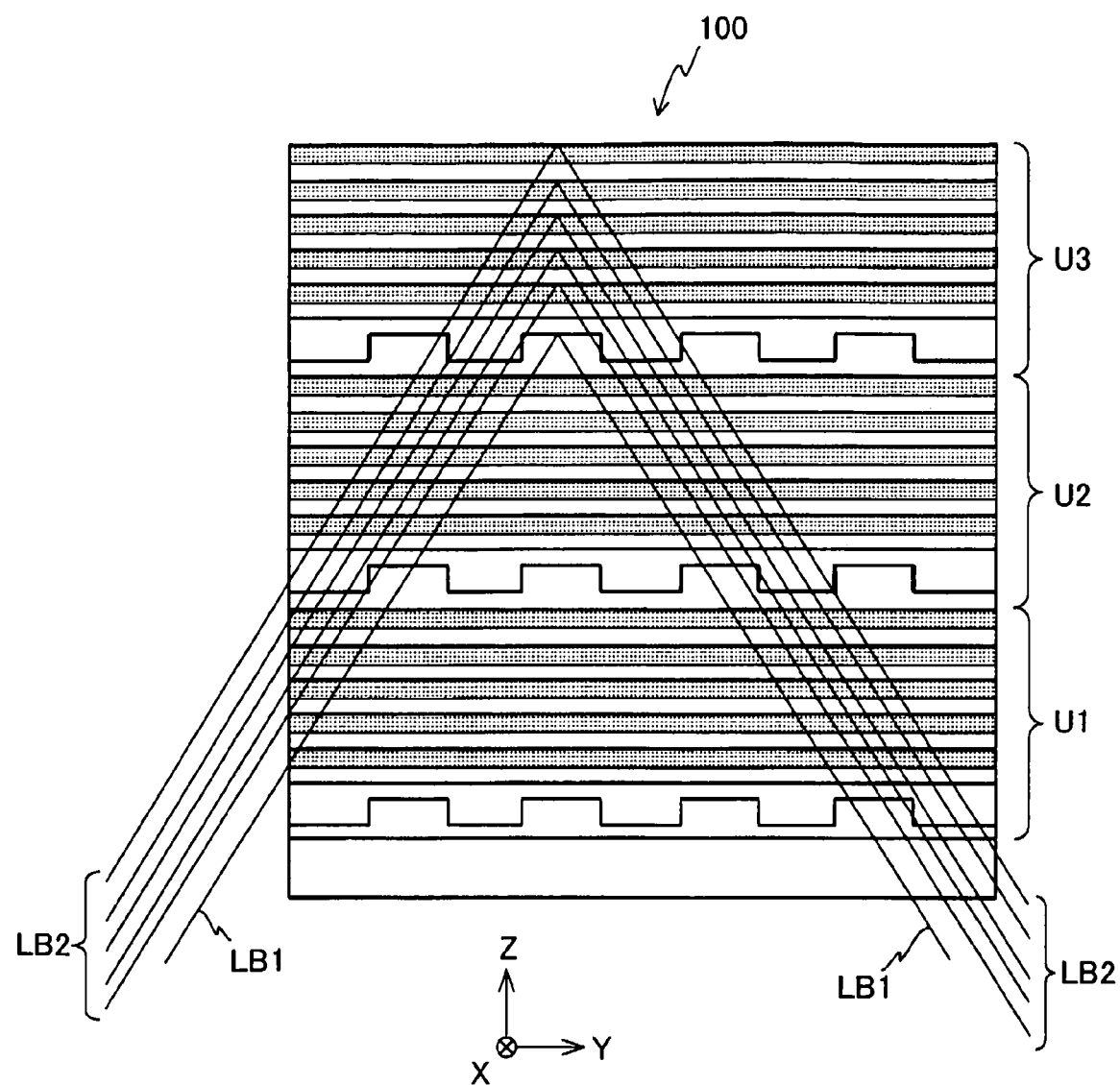
FIG. 21 is another drawing used to describe the exemplary optical pickup shown in FIG. 18.

The objective lens 160 is positioned downstream of the ¼ wavelength plate 155 in the Z direction and focuses light from the ¼ wavelength plate 155. As shown in FIGS. 19 through 21, each of the five recording/reproducing beams LB2 is focused on a different one of the recording layers D in a multilayer unit, and the servo beam LB1 is focused on the guide track layer S in the multilayer unit.

The detection lens 156 is positioned downstream of the polarization beam splitter 151 in the Y direction and gives astigmatism to light that is returned from the guide track layer S and reflected by the polarization beam splitter 151 in the Y direction.

The photodetector PD1 is positioned downstream of the detection lens 156 in the Y direction and receives light from the detection lens 156.

The photodetector PD2 is positioned downstream of the half mirror 159 in the -Z direction and receives light returned from the information layer M and reflected by the half mirror 159 in the -Z direction.

The driving mechanism includes a focusing actuator for finely adjusting the position of the objective lens 160 in the focus direction that is along the light axis of the objective lens 160; and a tracking actuator for finely adjusting the position of the objective lens 160 in the tracking direction that is orthogonal to a tangent to a track.

The working of the optical pickup 123 configured as mentioned above is described below. In the descriptions below, it is assumed that the five recording layers D in the multilayer unit U2 of the optical disk 100 are target recording layers.

The linearly polarized (p-polarized) servo beam LB1 emitted from the light source LD1 enters the polarization beam splitter 151. Most of the servo beam LB1 passes through the polarization beam splitter 151; is substantially collimated by the collimator lens 152; is aberration-corrected by the aberration correction optical element 153; and enters the dichroic prism 154. The servo beam LB1 passes through the dichroic prism 154; is circularly-polarized by the ¼ wavelength plate 155; and is focused on the guide track layer S in the multilayer unit U2 by the objective lens 160.

The light beam reflected from the guide track layer S in the multilayer unit U2 (returned light beam) is circularly-polarized in a direction opposite to that of the circular polarization of the incoming servo beam LB1. The returned light beam enters the ¼ wavelength plate 155 via the objective lens 160 and is linear-polarized (s-polarized) in a direction that is orthogonal to that of the linear polarization of the incoming servo beam LB1. Then, the returned light beam passes through the dichroic prism 154, the aberration correction optical element 153, and the collimator lens 152, and enters the polarization beam splitter 151.

The returned light beam is reflected by the polarization beam splitter 151 in the Y direction and, via the detection lens 156, received by the photodetector PD1. As in a conventional optical disk apparatus, the photodetector PD1 includes multiple light-receiving elements (or multiple light-receiving areas) each outputs a signal (control signal) containing information such as wobble signal information and servo information (focus error information, tracking error information, and so on). Each of the light-receiving elements (or light-receiving areas) generates a signal in proportion to the amount of received light by photoelectric conversion.

On the other hand, the linearly polarized (p-polarized) five recording/reproducing beams LB2 emitted from the light source LD2 enter the half mirror 159. The five recording/reproducing beams LB2 from the half mirror 159 pass through the diffractive-optical element 158 and the collimator lens 157; and enter the dichroic prism 154. The light paths of the five recording/reproducing beams LB2 are bended by the dichroic prism 154 in the Z direction. Then, the five recording/reproducing beams LB2 are circularly polarized by the ¼ wavelength plate 155; and focused on the five recording layers D in the multilayer unit U2 by the objective lens 160.

The five light beams reflected from the five recording layers D in the multilayer unit U2 (returned light beams) are circularly-polarized in a direction opposite to that of the circular polarization of the incoming recording/reproducing beams LB2. The returned light beams enter the ¼ wavelength plate 155 via the objective lens 160 and are linear-polarized (s-polarized) in a direction that is orthogonal to that of the linear polarization of the incoming recording/reproducing beams LB2. Then, the returned light beams are reflected by the dichroic prism 154 in the Y direction; pass through the collimator lens 157 and the diffractive-optical element 158; and enter the half mirror 159. The returned light beams are reflected by the half mirror 159 and received by the photodetector PD2. The photodetector PD2 includes five light-receiving elements (or five light-receiving areas) where each element (or area) receives a different one of the five returned light beams and outputs a signal containing information such as reproduction information. Each of the light-receiving elements (or light-receiving areas) generates a signal in proportion to the amount of received light by photoelectric conversion. In other words, the photodetector PD2 can read signals from the five recording layers D at the same time.

As described above, since the photodetector PD1 for receiving a light beam representing servo information and the photodetector PD2 for receiving light beams representing reproduction information are provided separately, each of the photodetectors can be configured to best suit its purpose. For example, a low-speed photodetector may be used as the photodetector PD1 and a high-speed photodetector may be used as the photodetector PD2. Especially, it is preferable to design an optical drive using a low-speed photodetector as the photodetector PD1 for receiving a short-wavelength light that is comparatively difficult to detect. Also, since a servo beam with a fixed intensity can be used for both recording and reproduction, no gain switch is necessary for the photodetector PD1. This makes it possible to simplify the circuit configuration of the photodetector PD1.

Further, a Si-PIN photodiode with a wide dynamic range may be used for the photodetector PD1 and an avalanche photodiode (APD) with a high multiplication factor may be used for the photodetector PD2. A Si-PIN photodiode is suitable for accurate detection of a light beam representing servo information which detection requires a wide dynamic range and linearity to the amount of light. On the other hand, an avalanche photodiode can amplify a weak light beam representing reproduction information which light beam is reflected from the recording layer D having a low reflectance.

An exemplary configuration of an optical disk apparatus 120 that is an optical drive according to an embodiment of the present invention is described below with reference to FIG. 22.

Figure 22:
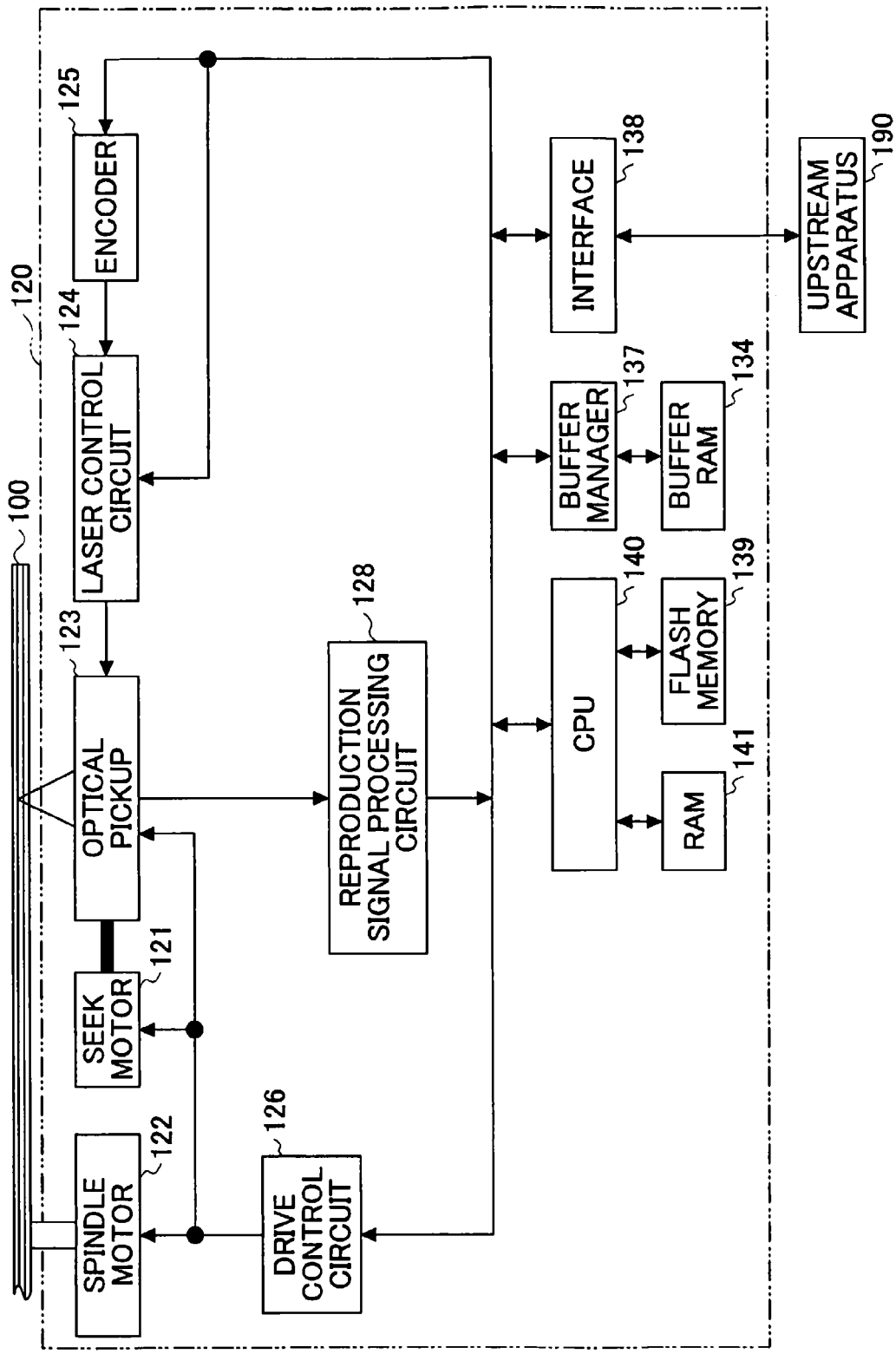
FIG. 22 is a block diagram illustrating the configuration of an exemplary optical disk apparatus that is an optical drive according to an embodiment of the present invention.

As shown in FIG. 22, the optical disk apparatus 120 includes a spindle motor 122 for rotating an optical disk, the optical pickup 123, a seek motor 121 for driving the optical pickup 123, a laser control circuit 124, an encoder 125, a drive control circuit 126, a reproduction signal processing circuit 128, a buffer RAM 134, a buffer manager 137, an interface 138, a flash memory 139, a CPU 140, and a RAM 141. Arrows in FIG. 22 indicate flow of signals and information and do not represent all connections between the blocks. The optical disk apparatus 120 is usable for recording/reproducing information on the optical disk 100.

The reproduction signal processing circuit 128 obtains, for example, address information, a synchronization signal, and servo signals such as a focus error signal and a tracking error signal based on the output signals (photoelectric conversion signals) from the photodetector PD1. Also, the reproduction signal processing circuit 128 obtains RF signals from the recording layers D based on the output signals (five photoelectric conversion signals) from the photodetector PD2.

The servo signals are output to the drive control circuit 126, the address information is output to the CPU 140, and the synchronization signal is output to the encoder 125 and the drive control circuit 126. Further, the reproduction signal processing circuit 128 performs decoding and error detection on each of the RF signals and then stores the RF signal as reproduced data via the buffer manager 137 in the buffer RAM 134. When an error is detected in an RF signal, the reproduction signal processing circuit 128 performs error correction before storing the RF signal in the buffer RAM 134. The address information contained in the reproduced data is output to the CPU 140.

The drive control circuit 126 generates driving signals for the driving mechanism of the optical pickup 123 based on servo signals from the reproduction signal processing circuit 128 and outputs the driving signals to the optical pickup 123. The optical pickup 123 performs tracking control and focus control according to the driving signals. The drive control circuit 126 generate a driving signal for driving the seek motor 121 and a driving signal for driving the spindle motor 122 according to an instruction from the CPU 140. The driving signals are output to the seek motor 121 and the spindle motor 122.

The buffer RAM 134 temporarily stores, for example, data to be recorded on the optical disk 100 (recording data) and data reproduced from the optical disk 100 (reproduced data). Data input/output to or from the buffer RAM 134 is controlled by the buffer manager 137.

The encoder 125, according to an instruction from the CPU 140, retrieves recording data in the buffer RAM 134 via the buffer manager 137; modulates the recording data; attaches an error correcting code to the recording data; and generates recording signals to be written on the information layer M of the optical disk 100. For example, to record information on the five recording layers D, five recording signals are generated. The generated recording signals are output to the laser control circuit 124.

The laser control circuit 124 controls the light emission power of each of the light sources of the optical pickup 123.

When recording information, a driving signal for the light source LD2 is generated based on the recording signal, recording conditions, light emission characteristics of the laser diode array of the light source LD2, and so on. For example, to simultaneously record information on the five recording layers D, five driving signals are generated for the five light-emitting parts of the laser diode array.

The interface 138 enables two-way communication between the optical disk apparatus 120 and an upstream apparatus 190 (for example, a personal computer). The interface 138 is a standard interface such as an AT attachment packet interface (ATAPI), a small computer system interface (SCSI), or a universal serial bus (USB).

The flash memory 139 stores, for example, programs written in code that the CPU 140 can understand, light emission characteristics of the laser diode of the light source LD1, light emission characteristics of the laser diode array of the light source LD2, and recording conditions including recording power and recording strategy information.

The CPU 140 controls the operations of other units in the optical disk apparatus 120 according to the programs stored in the flash memory 139 and stores, for example, control data in the RAM 141 and the buffer RAM 134.

<Recording Process>

An exemplary recording process in the optical disk apparatus 120, which recording process is performed when recording of user data is requested from the upstream apparatus 190, is described below with reference to FIG. 23. The flowchart shown in FIG. 23 corresponds to a set of processing algorithms executed by the CPU 140. In the exemplary recording process, it is assumed that user data are recorded on multiple recording layers.

Figure 23:
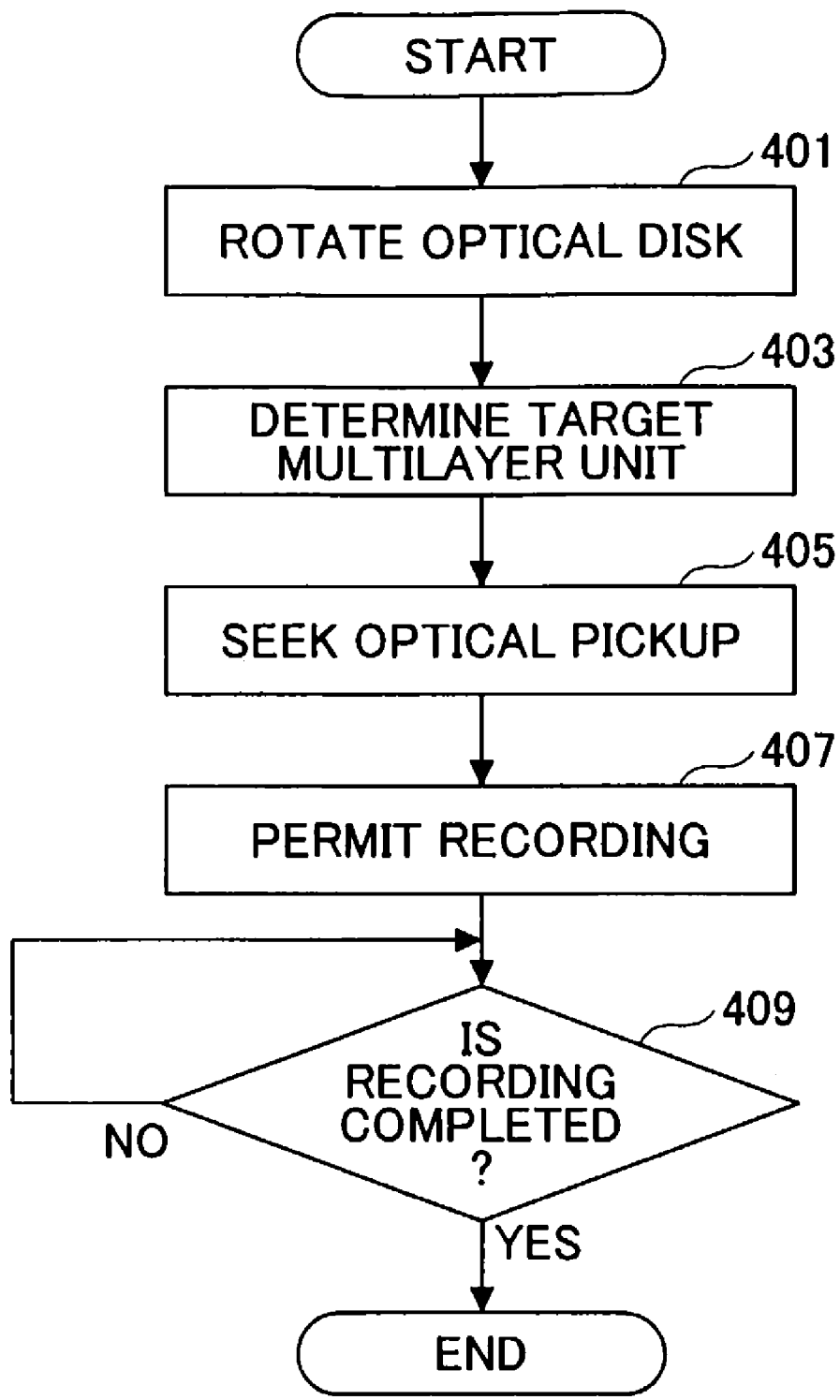
FIG. 23 is a flowchart showing an exemplary recording process performed by the exemplary optical disk apparatus shown in FIG. 22 when a recording request is received from an upstream apparatus.

When a recording command is received from the upstream apparatus 190, the initial address of a program corresponding to the flowchart shown in FIG. 23 is set in the program counter of the CPU 140 and a recording process is started.

In step 401, the CPU 140 instructs the drive control circuit 126 to cause the spindle motor 122 to rotate the optical disk 100 at a specified linear velocity (or angular velocity) and reports the reception of the recording command from the upstream apparatus 190 to the reproduction signal processing circuit 128.

In step 403, the CPU 140 analyzes the recording command and determines target recording layers and a target multilayer unit based on the addresses specified in the recording command. Then, the CPU 140 reports the determined information to the reproduction signal processing circuit 128, the drive control circuit 126, the encoder 125, and the laser control circuit 124. Based on the determined information, the drive control circuit 126 controls the objective lens 160 so that the servo beam LB1 is focused on the guide track layer S in the target multilayer unit. Also, the CPU 140 determines light-emitting parts of the light source LD2 that are to be driven and light-receiving elements (or light-receiving areas) of the photodetector PD2 that are to generate signals.

In step 405, the CPU 140 refers to address information obtained based on an output signal from the photodetector PD1 and instructs the drive control circuit 126 to cause the seek motor 121 to seek the optical pickup 123 so that a light spot is formed around a target position corresponding to the specified address. If seek operation is not necessary, this step is skipped.

In step 407, the CPU 140 permits recording of data. With the permission, the encoder 125 and the laser control circuit 124 causes the optical pickup 123 to record data on the target recording layers substantially at the same time. During the recording, tracking control and focus control described above are performed at specified timings.

In step 409, the CPU 140 determines whether the recording of data is completed. If the recording of data is not completed, the recording is continued and the CPU 140 performs this step again after a specified period of time. If the recording of data is completed, the recording process is terminated. In the exemplary recording process, data are recorded on multiple recording layers substantially at the same time. Therefore, the exemplary recording process makes it possible to reduce the time for recording.

<Reproduction Process>

An exemplary reproduction process in the optical disk apparatus 120, which reproduction process is performed when reproduction of data is requested from the upstream apparatus 190, is described below with reference to FIG. 24. The flowchart shown in FIG. 24 corresponds to a set of processing algorithms executed by the CPU 140. In the exemplary reproduction process, it is assumed that data on multiple recording layers are reproduced.

Figure 24:
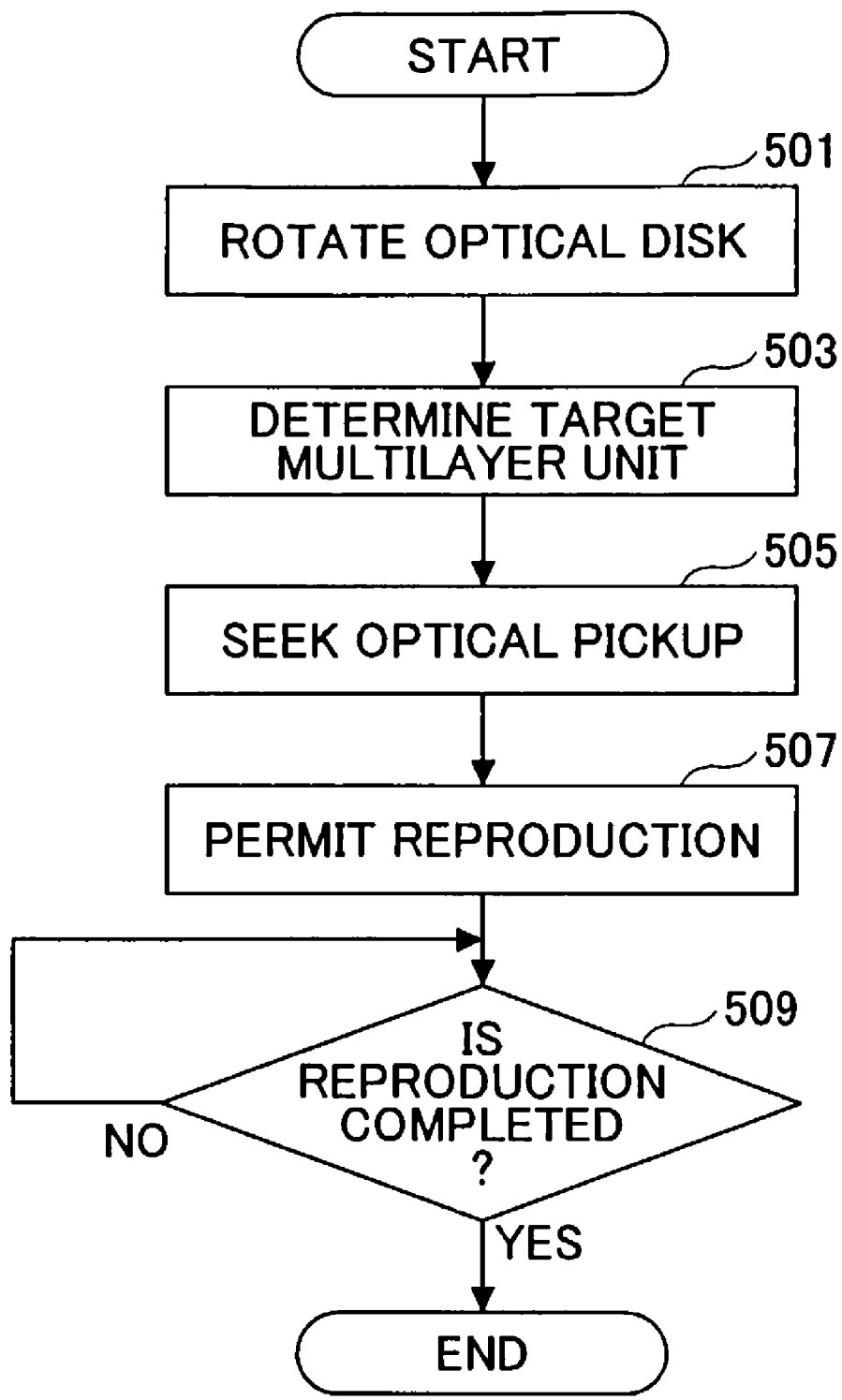
FIG. 24 is a flowchart showing an exemplary reproduction process performed by the exemplary optical disk apparatus shown in FIG. 22 when a reproduction request is received from an upstream apparatus.

When a reproduction command is received from the upstream apparatus 190, the initial address of a program corresponding to the flowchart shown in FIG. 24 is set in the program counter of the CPU 140 and a reproduction process is started.

In step 501, the CPU 140 instructs the drive control circuit 126 to cause the spindle motor 122 to rotate the optical disk 100 at a specified linear velocity (or angular velocity) and reports the reception of the reproduction command from the upstream apparatus 190 to the reproduction signal processing circuit 128.

In step 503, the CPU 140 analyses the reproduction command and determines target recording layers and a target multilayer unit based on the addresses specified in the reproduction command. Then, the CPU 140 reports the determined information to the reproduction signal processing circuit 128, the drive control circuit 126, and the laser control circuit 124. Based on the determined information, the drive control circuit 126 controls the objective lens 160 so that the servo beam LB1 is focused on the guide track layer S in the target multilayer unit. Also, the CPU 140 determines light-emitting parts of the light source LD2 that are to be driven and light-receiving elements (or light-receiving areas) of the photodetector PD2 that are to generate signals.

In step 505, the CPU 140 instructs the drive control circuit 126 to cause the seek motor 121 to drive the optical pickup 123 so that a light spot is formed around a target position corresponding to the specified address. If seek operation is not necessary, this step is skipped.

In step 507, the CPU 140 permits reproduction of data. With the permission, the optical pickup 123 and the reproduction signal processing circuit 128 reproduce data on the target recording layers substantially at the same time. The reproduced data are stored in the buffer RAM 134. When the reproduced data reach a specified amount, the reproduced data are transferred to the upstream apparatus 190.

In step 509, the CPU 140 determines whether the reproduction of data is completed. If the reproduction of data is not completed, the reproduction is continued and the CPU 140 performs this step again after a specified period of time. If the reproduction of data is completed, the reproduction process is terminated. In the exemplary reproduction process, data on multiple recording layers are reproduced substantially at the same time. Therefore, the exemplary reproduction process makes it possible to reduce the time for reproduction.

As described above, in the optical disk 100 according to an embodiment of the present invention, the guide track layer S functions as a guide layer.

In the optical pickup 123 according to an embodiment of the present invention, the light source D1 emits a light beam with a first wavelength, the light source LD2 emits light beams with a second wavelength, the photodetector PD1 receives a light beam reflected from a guide layer, and the photodetector PD2 separately receives multiple light beams reflected from multiple recording layers.

In the optical disk apparatus 120 according to an embodiment of the present invention, the reproduction signal processing circuit 128, the CPU 140, and programs executed by the CPU 140 constitute a processing unit. A part or the whole of the processing implemented by the programs executed by the CPU 140 may be implemented by hardware.

As described above, the optical disk 100 according to an embodiment of the present invention includes multiple multilayer units each including the guide track layer S (guide layer) corresponding to light with a wavelength between 390 and 420 nm (a first wavelength) and multiple recording layers D made of a two-photon absorption material and corresponding to light with a wavelength between 650 and 680 nm (a second wavelength). This structure provides a high capacity multilayer optical information recording medium with a tilt tolerance that is substantially equal to that of a recording medium having only a few recording layers.

With the optical disk 100 according to an embodiment of the present invention, a laser beam with a wavelength of 660 nm may be used as a recording/reproducing beam; and a laser beam with a wavelength of 405 nm may be used as a servo beam. This eliminates the need to use an expensive laser such as a femtosecond laser and thereby makes it possible to produce an optical pickup and an optical disk apparatus for recording/reproducing information on the optical disk 100 at low costs.

In the optical disk 100 according to an embodiment of the present invention, one guide track layer S is provided for multiple recording layers D. This structure eliminates the need to form guide grooves on each recording layer and thereby makes it possible to simplify a part of the production process.

In the optical disk 100 according to an embodiment of the present invention, the guide track layer S and the recording layers D are provided separately. With this structure, a servo beam does not form a small light spot near recording layers and, therefore, even when blue light is used for the servo beam, degradation of recording layers made of a two-photon absorption material, which is sensitive to blue through ultraviolet light, can be prevented.

In the optical disk 100 according to an embodiment of the present invention, the guide track layer S is positioned closer to the incidence plane than the information layer M. With this structure, the substrate thickness that a servo beam passes through becomes small. Therefore, even when blue light is used for the servo beam and even when the optical disk 100 is tilted 1 degree in relation to the objective lens 160, highly accurate servo information can be obtained. In other words, the optical disk 100 has a high tilt tolerance.

The optical pickup 123 according to an embodiment of the present invention uses a blue-light emitting laser diode as the light source of a servo beam and therefore is able to accurately obtain signals for servo control from the optical disk 100.

The optical pickup 123 according to an embodiment of the present invention uses a blue-light emitting laser diode as the light source of a servo beam and red-light emitting laser diodes for the light source of recording/reproducing beams. This configuration makes it possible to reduce the size and costs of an optical pickup.

In the optical pickup 123 according to an embodiment of the present invention, the focal point of light with a wavelength of about 405 nm is closer to the objective lens 160 than that of light with a wavelength of about 660 nm. This configuration prevents degradation of the recording layers D in the optical disk 100. Also, since the refractive index of glass generally becomes higher as the wavelength of light becomes shorter, it is rather easy to design an objective lens with a short focal length for short wavelength light. More specifically, an inexpensive lens designed to handle both short wavelength light and long wavelength light implemented by using chromatic aberration of a lens material may be used as an objective lens.

In the optical pickup 123 according to an embodiment of the present invention, a photodetector for receiving a reflected servo beam and a photodetector for receiving reflected recording/reproducing light beams are provided separately. This configuration makes it possible to optimize the response speed, gain, sensitivity, modulation characteristic, and so on of each photodetector so that each photodetector can generate an appropriate signal.

The optical disk apparatus 120 according to an embodiment of the present invention includes the optical pickup 123 described above and is therefore able to accurately record, reproduce, and/or delete information on the optical disk 100.

In the embodiments described above, the optical disk 100 includes three multilayer units. However, the number of multilayer units in the optical disk 100 is not limited to three.

In the embodiments described above, each multilayer unit includes five recording layers. However, the number of recording layers in a multilayer unit is not limited to five. When the number of recording layers in each multilayer unit is less/more than five, the number of light-emitting parts of the light source LD2 may be changed according to the number of recording layers.

Figure 25:
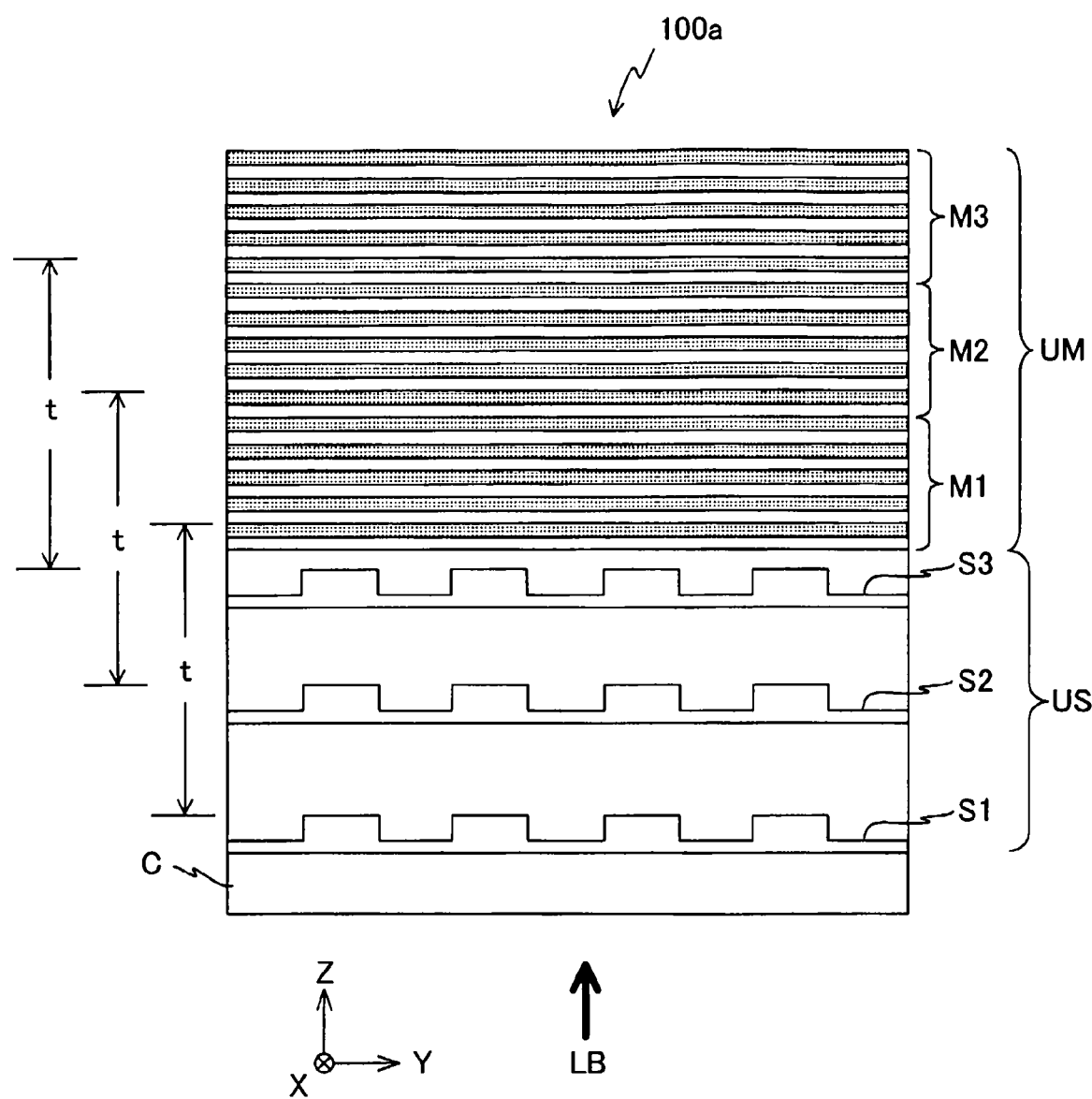
FIG. 25 is a drawing illustrating an exemplary structure of an optical disk 100a that is a multilayer optical information recording medium according to an embodiment of the present invention.

Also, a multilayer optical information recording medium according to an embodiment of the present invention may have a structure like that of an optical disk 100a shown in FIG. 25. In the optical disk 100a, multiple guide track layers (S1, S2, and S3) are stacked on the upper surface of the cover layer C; and multiple information layers (M1, M2, and M3) are stacked on top of the guide track layers (S1, S2, and S3). In the optical disk 100a, the distance between the guide track layer S1 and the information layer M1, the distance between the guide track layer S2 and the information layer M2, and the distance between the guide track layer S3 and the information layer M3 are the same distance t.

Figure 26:
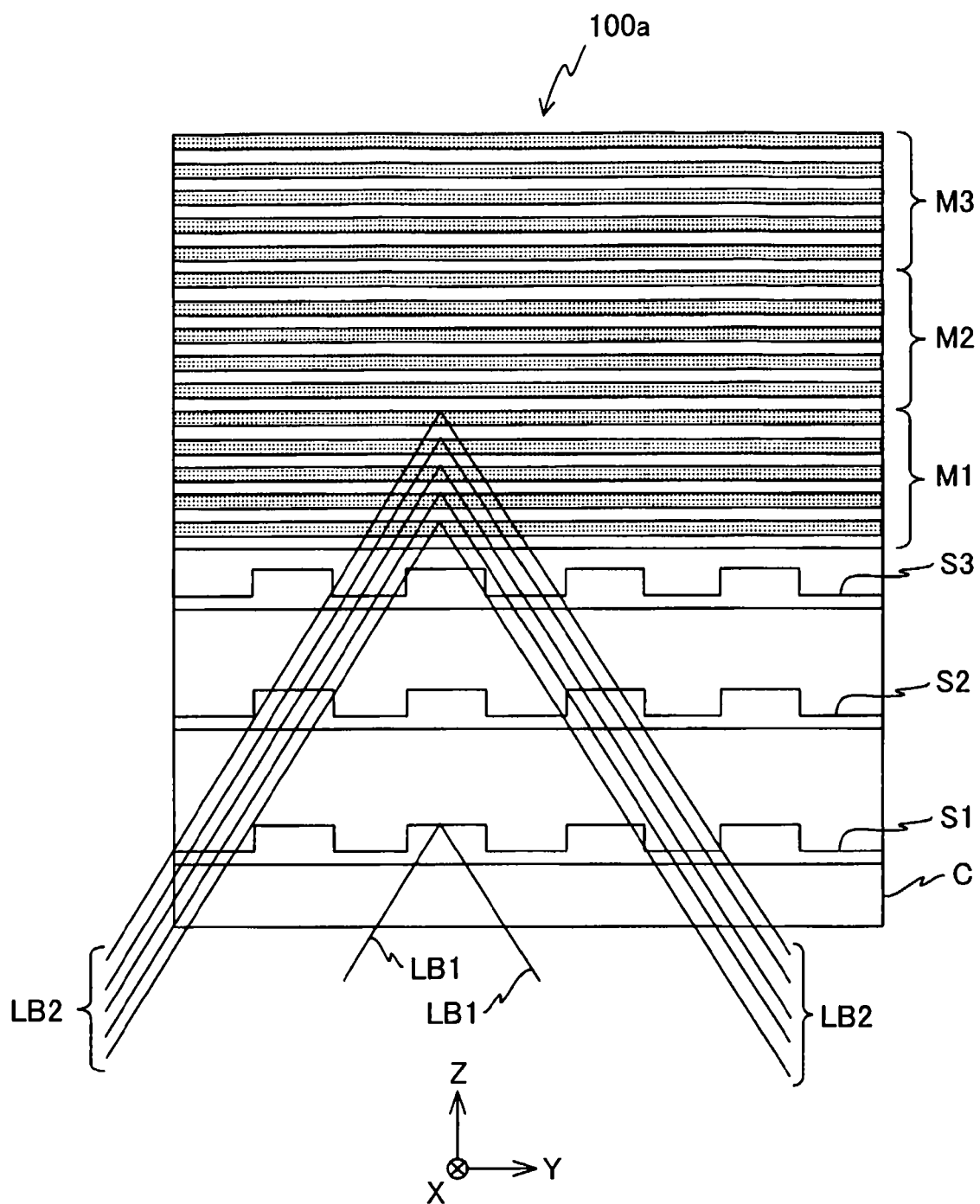
FIG. 26 is a drawing illustrating exemplary focal points of a servo beam and a recording/reproducing beam in the optical disk 100a shown in FIG. 25.
Figure 27:
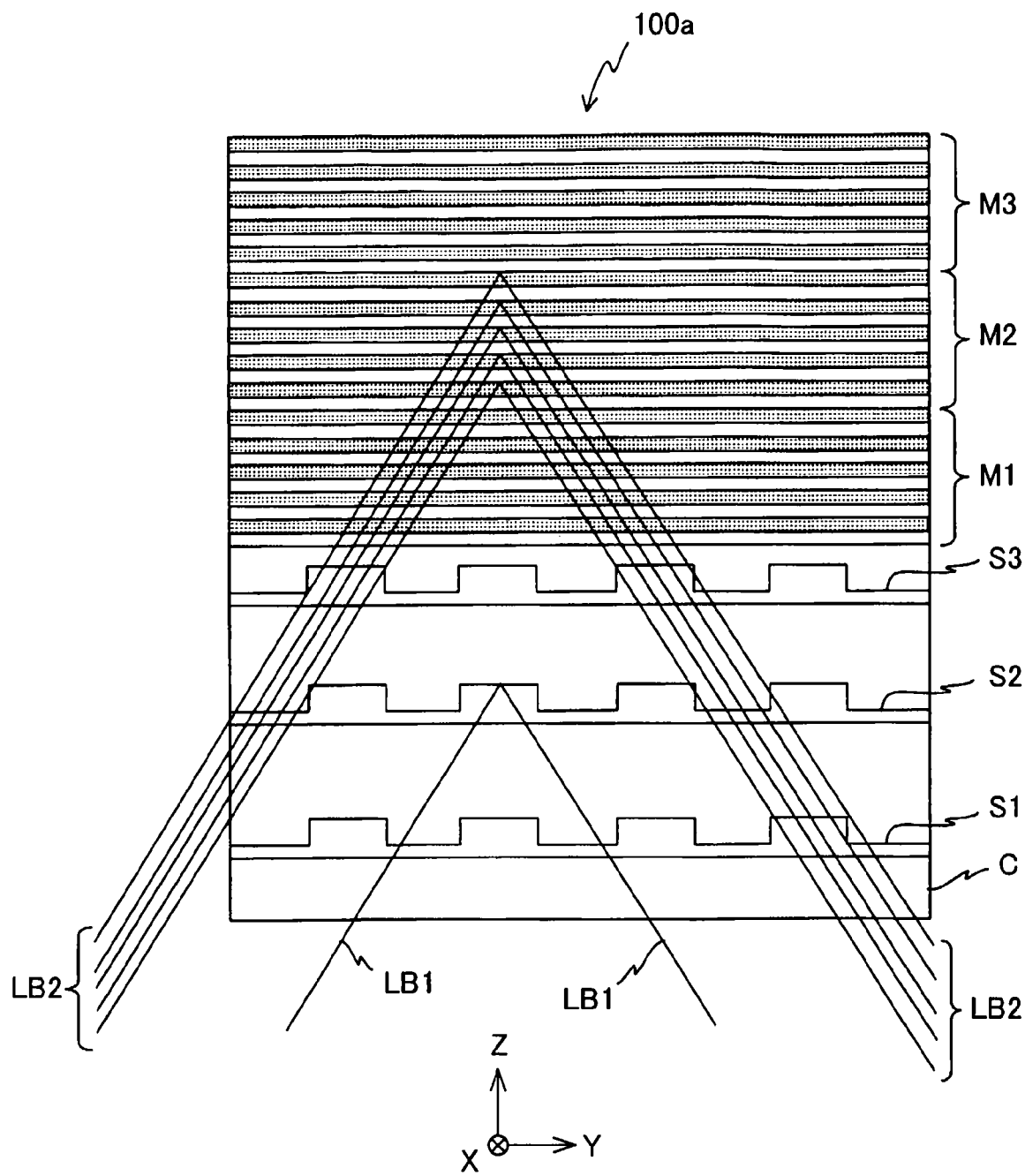
FIG. 27 is another drawing illustrating exemplary focal points of a servo beam and recording/reproducing beams in the optical disk 100a shown in FIG. 25.
Figure 28:
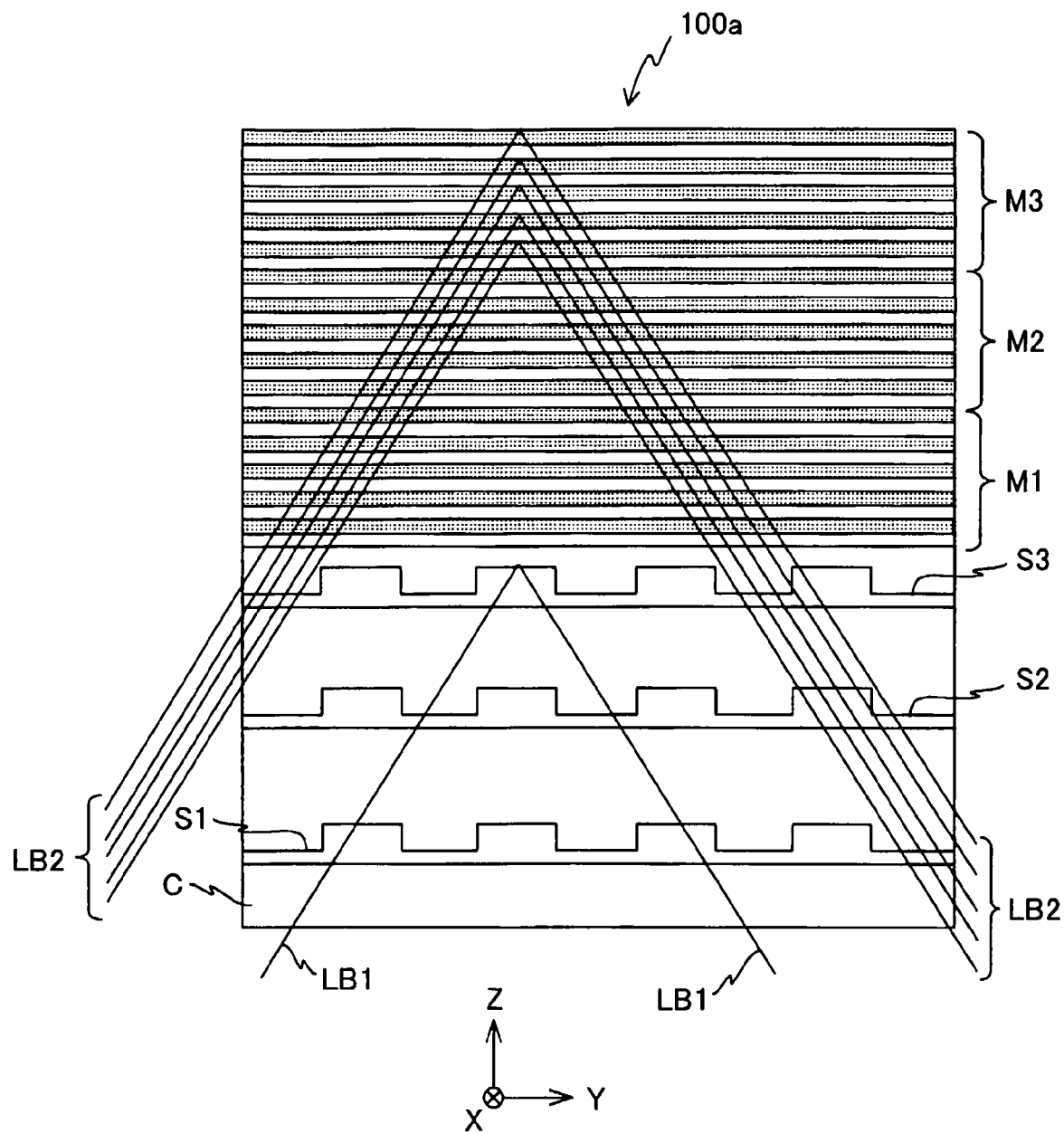
FIG. 28 is another drawing illustrating exemplary focal points of a servo beam and recording/reproducing beams in the optical disk 100a shown in FIG. 25.

In the optical disk 100a, as shown FIGS. 26 through 28, the guide track layer S1 is used for servo control when recording/reproducing information on the information layer M1, the guide track layer S2 is used for servo control when recording/reproducing information on the information layer M2, and the guide track layer S3 is used for servo control when recording/reproducing information on the information layer M3. Therefore, in this case, the objective lens 160 is configured so that the distance between the focal point of the servo beam LB1 and the focal point of the closest one of the recording/reproducing beams LB2 equals the distance t.

Also, in the optical disk 100a, the guide track layers S1 through S3 are positioned closer to the incidence plane than the information layers M1 through M3. Therefore, even when a servo beam moves from one guide track layer to another, the servo beam does not pass through a recording layer. This prevents reflection (flare) of the servo beam from layers other than the target layer and thereby makes it possible to obtain a stable servo signal and to perform servo control at high speed without interruption.

Further, in the optical disk 100a, recording layers and guide track layers are separated. This structure makes it possible to simplify the production process.

Figure 29:
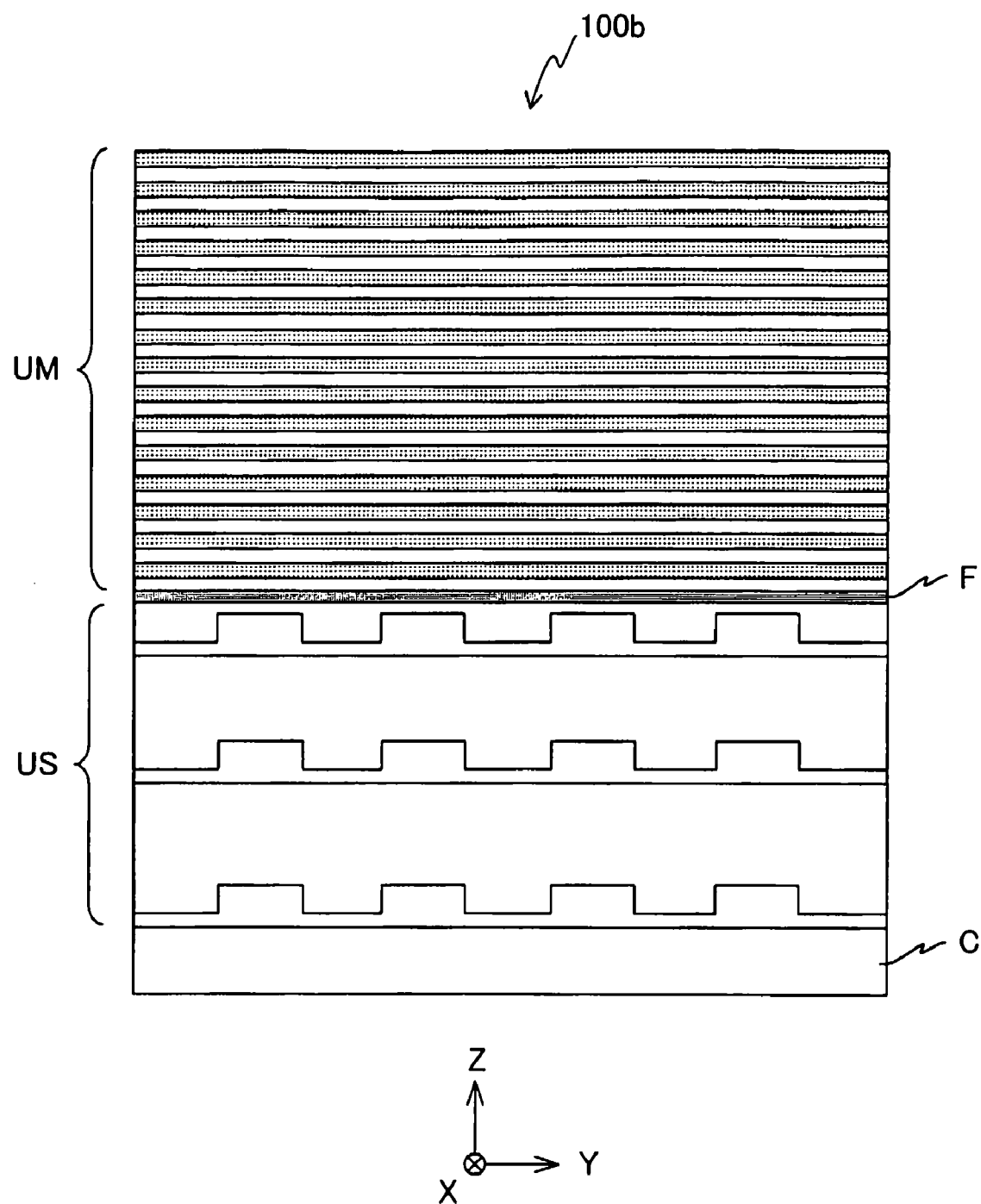
FIG. 29 is a drawing illustrating an exemplary structure of an optical disk 100b that is a multilayer optical information recording medium according to an embodiment of the present invention.

According to another embodiment of the present invention, a multilayer optical information recording medium may have a structure like that of an optical disk 100b shown in FIG. 29.

In the optical disk 100b, a filter layer F is provided between a set of guide track layers and a set of information layers. The filter layer F reflects light with a wavelength between 390 and 420 nm and transmits light with a wavelength between 650 and 680 nm. In other words, the filter layer F reflects the servo beam LB1 and thereby prevents the servo beam LB1 from reaching the recording layers D made of a two-photon absorption material. This, in turn, eliminates one of the causes that degrade the recording layers D and makes it possible to reliably record/reproduce information.

Figure 30:
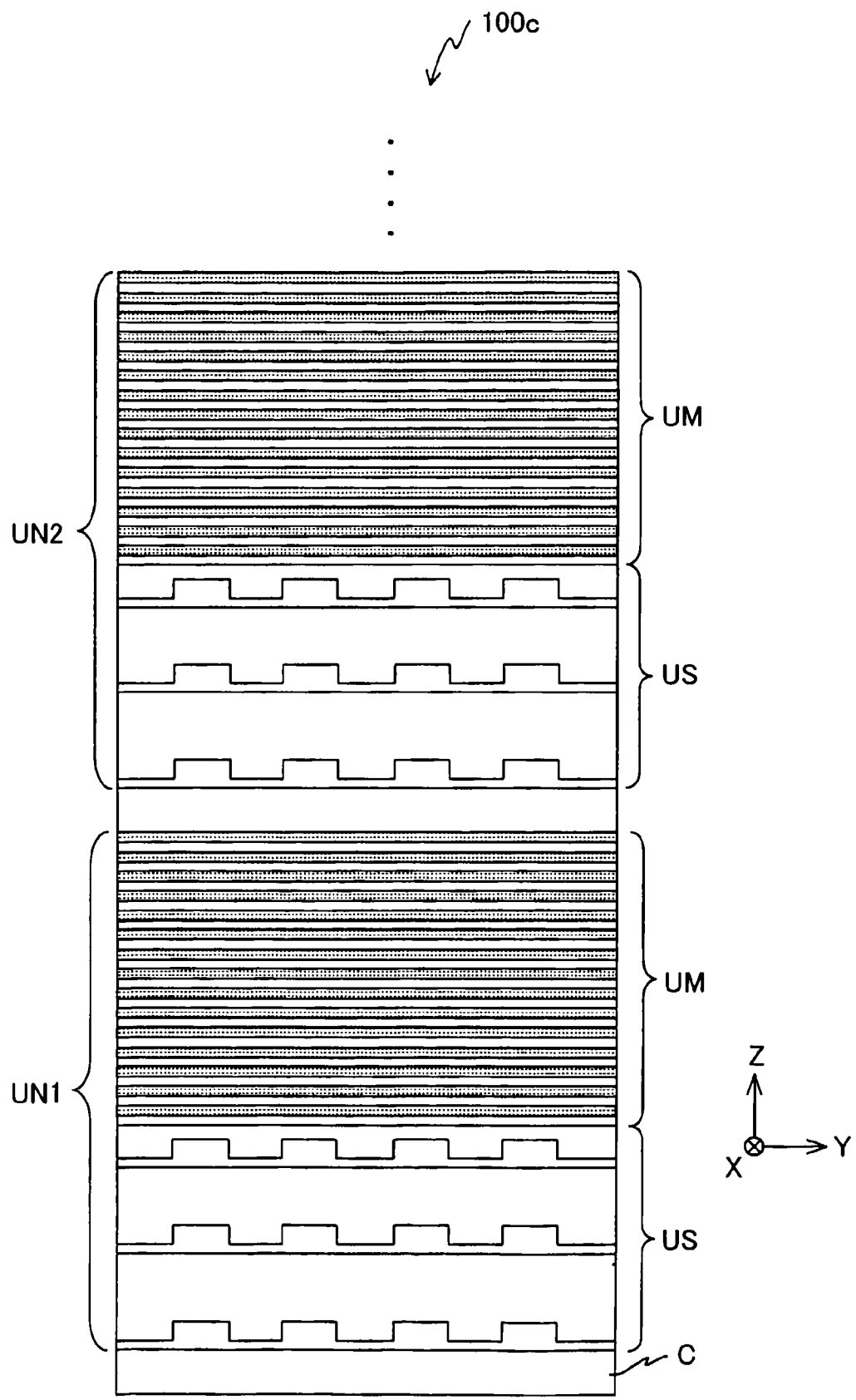
FIG. 30 is a drawing illustrating an exemplary structure of an optical disk 100c that is a multilayer optical information recording medium according to an embodiment of the present invention.

According to still another embodiment of the present invention, a multilayer optical information recording medium may have a structure like that of an optical disk 100c shown in FIG. 30. The optical disk 100c includes multiple multilayer units (UN1, UN2, . . . ) each including multiple guide track layers and multiple information layers.

The optical pickup 123 may be easily adapted for the optical disk 100a by changing the effective diameters of the servo beam LB1 and the recording/reproducing beams LB2 according to the distance t in the optical disk 100a and by changing the numerical aperture of the objective lens 160.

According to embodiments of the present invention, the wavelength of light emitted from the light source LD1 is preferably between 390 and 420 nm and the wavelength of light emitted from the light source LD2 is preferably between 650 and 680 nm.

In the above embodiments, the guide track layer S corresponds to light with a wavelength between 390 and 420 nm and the recording layer D corresponds to light with a wavelength between 650 and 680 nm. However, the wavelength range of the light for the guide track layer S and the wavelength range of the light for the recording layer D are not limited to the above ranges as long as the wavelength ranges do not overlap. Even when the wavelength ranges are different from those described above, the light source LD1 emits light for the guide track layer S and the light source LD2 emits light for the recording layer D.

The optical disk apparatus 120 according to an embodiment of the present invention is configured to record and reproduce information on an optical disk. However, the optical disk apparatus 120 may be configured to only reproduce information on an optical disk.

The optical disk apparatus 120 and the optical pickup 123 according to an embodiment of the present invention are configured to record/reproduce information on multiple recording layers at substantially the same time. However, the optical disk apparatus 120 and the optical pickup 123 may be configured to record/reproduce information on one recording layer at a time. In this case, the light source LD2 may be configured to include only one light-emitting part. Also, the photodetector PD2 may be configured to include only one light-receiving element (or light-receiving area).

In the above embodiments, guide grooves are formed on the guide track layer S. However, guide pits (prepits) may be formed on the guide track layer S instead of the guide grooves. Also, both grooves and prepits may be formed on the guide track layer S.

The guide track layer S may be designed to be recordable. A recordable guide track layer S makes it possible to further increase the storage capacity of an optical disk. In this case, like a hybrid disk, the guide track layer S may be used, for example, to store read-only programs or security data. Also, recording such data according to the Blu-ray standard makes it possible to use a signal processing system of an optical disk apparatus conforming to the Blu-ray standard and thereby makes it possible to reduce the production costs of an optical disk apparatus.

Further, the guide track layer S may contain pre-recorded information such as a unit number to identify its location in an optical disk. Such identification information helps reduce the time to access the guide track layer S or to jump between multiple guide track layers S.

As described above, an embodiment of the present invention provides a high capacity multilayer optical information recording medium with a tilt tolerance that is substantially equal to that of a recording medium having only a few recording layers. Another embodiment of the present invention provides an optical head that can accurately receive a signal from a multilayer optical information recording medium according to an embodiment of the present invention. Still another embodiment of the present invention provides an optical drive that can accurately record, reproduce, and/or delete information on a multilayer optical information recording medium according to an embodiment of the present invention.

The present invention is not limited to the specifically disclosed embodiments, and variations and modifications may be made without departing from the scope of the present invention.

The present application is based on Japanese Priority Application No. 2005-349202 filed on Dec. 2, 2005 and Japanese Priority Application No. 2006-016382 filed on Jan. 25, 2006, the entire contents of which are hereby incorporated herein by reference.

The invention claimed is:

1. An optical recording medium, comprising:
multiple multilayer units each including
a guide layer corresponding to light with a first wavelength, and
multiple recording layers corresponding to light with a second wavelength that is different from the first wavelength;
wherein the multilayer units are stacked in a depth direction of the optical recording medium, and wherein
tracks are formed spirally or concentrically on the guide layer, and
when n indicates a number of the recording layers in each of the multilayer units, d indicates a thickness of each of the recording layers, and p indicates a pitch between the tracks, $n \times d \times \sin(1°) < p$ is true.

2. The optical recording medium as claimed in claim 1, wherein the recording layers are stacked on an upper side or a lower side of the guide layer.

3. The optical recording medium as claimed in claim 2, wherein
both the light with the first wavelength and the light with the second wavelength enter the optical recording medium through a same incidence plane; and
the guide layer is positioned closer to the incidence plane than the recording layers in each of the multilayer units.

4. An optical recording medium, comprising:
multiple guide layers corresponding to light with a first wavelength; and
multiple recording layers corresponding to light with a second wavelength that is different from the first wavelength, wherein
both the light with the first wavelength and the light with the second wavelength enter the optical recording medium through a same incidence plane, and
the guide layers are positioned closer to the incidence plane than the recording layers wherein when n indicates a number of the recording layers, d indicates a thickness of each of the recording layers, and p indicates a pitch between the tracks, $n \times d \times \sin(1°) < p$ is true.

5. The optical recording medium as claimed in claim 4, wherein a filter layer that reflects the light with the first wavelength and transmits the light with the second wavelength is provided between the guide layers and the recording layers.

6. An optical recording medium, comprising:
multiple multilayer units each including
multiple guide layers corresponding to light with a first wavelength, and
multiple recording layers corresponding to light with a second wavelength that is different from the first wavelength;
wherein the multilayer units are stacked in a depth direction of the optical recording medium, wherein
both the light with the first wavelength and the light with the second wavelength enter the optical recording medium through a same incidence plane, and
the guide layers are positioned closer to the incidence plane than the recording layers in each of the multilayer units wherein when n indicates a number of the recording layers in each of the multilayer units, d indicates a thickness of each of the recording layers, and p indicates a pitch between the tracks, n×d×sin (1°)<p is true.

7. The optical recording medium as claimed in claim 1, wherein information can be recorded on the guide layer.

8. The optical recording medium as claimed in claim 1, wherein information is prerecorded on the guide layer.

9. The optical recording medium as claimed in claim 8, wherein the information prerecorded on the guide layer includes information to identify a location of the guide layer in the optical recording medium.

10. The optical recording medium as claimed in claim 1, wherein the first wavelength is shorter than the second wavelength.

11. The optical recording medium as claimed in claim 10, wherein the first wavelength is between 390 and 420 nm and the second wavelength is between 650 and 680 nm.

12. The optical recording medium as claimed in claim 1, wherein at least guide grooves or guide pits are formed on the guide layer.

13. An optical head for recording or reproducing information on the optical recording medium as claimed in claim 1, comprising:
a first light source configured to emit a light beam with the first wavelength;
a second light source configured to emit a light beam with the second wavelength;
an objective lens configured to focus the light beam with the first wavelength on the guide layer and to focus the light beam with the second wavelength on one of the recording layers;
an optical system configured to guide the light beam with the first wavelength and the light beam with the second wavelength to the objective lens and to separate a light beam reflected from the guide layer and a light beam reflected from the one of the recording layers;
a first photodetector configured to detect the light beam reflected from the guide layer; and
a second photodetector configured to detect the light beam reflected from the one of the recording layers.

14. An optical head for recording or reproducing information on the optical recording medium as claimed in claim 1, comprising:
a first light source configured to emit a light beam with the first wavelength;
a second light source including multiple light-emitting parts and configured to emit multiple light beams with the second wavelength from the light-emitting parts;
an objective lens configured to focus the light beam with the first wavelength on the guide layer and to focus the light beams with the second wavelength on the recording layers;
an optical system configured to guide the light beam with the first wavelength and the light beams with the second wavelength to the objective lens and to separate light beam reflected from the guide layer and light beams reflected from the recording layers;
a first photodetector configured to detect the light beam reflected from the guide layer; and
a second photodetector including multiple light-receiving parts and configured to detect the light beams reflected from the recording layers separately with the light-receiving parts.

15. The optical head as claimed in claim 13, wherein the objective lens is configured so that a focal point of the light beam with the first wavelength becomes closer to the objective lens than a focal point of the light beam with the second wavelength.

16. An optical drive for recording, reproducing, or deleting information on the optical recording medium as claimed in claim 1, comprising:
an optical head including
a first light source configured to emit a light beam with the first wavelength,
a second light source configured to emit a light beam with the second wavelength,
an objective lens configured to focus the light beam with the first wavelength on the guide layer and to focus the light beam with the second wavelength on one of the recording layers,
an optical system configured to guide the light beam with the first wavelength and the light beam with the second wavelength to the objective lens and to separate a light beam reflected from the guide layer and a light beam reflected from the one of the recording layers,
a first photodetector configured to detect the light beam reflected from the guide layer, and
a second photodetector configured to detect the light beam reflected from the one of the recording layers; and
a processing unit configured to reproduce the information on the optical recording medium based on an output signal from the second photodetector of the optical head.

* * * * *